(12) United States Patent
Hosoi

(10) Patent No.: US 7,285,068 B2
(45) Date of Patent: Oct. 23, 2007

(54) CONTINUOUSLY VARIABLE TRANSMISSION AND ENGINE

(75) Inventor: Yukiharu Hosoi, Shizuoka-ken (JP)

(73) Assignee: Yamaha Hatsudoki Kabushiki Kaisha, Shizuoka-ken (KP)

( * ) Notice: Subject to any disclaimer, the term of this patent is extended or adjusted under 35 U.S.C. 154(b) by 182 days.

(21) Appl. No.: 11/259,496

(22) Filed: Oct. 25, 2005

(65) Prior Publication Data

US 2007/0093345 A1    Apr. 26, 2007

(51) Int. Cl.
*F16H 15/48* (2006.01)
(52) U.S. Cl. ...................................... 475/189
(58) Field of Classification Search ................ 475/189; 476/38
See application file for complete search history.

(56) References Cited

U.S. PATENT DOCUMENTS

| | | | |
|---|---|---|---|
| 3,229,538 A | 1/1966 | Schottler | |
| 3,237,468 A | 3/1966 | Schottler | |
| 3,248,960 A | 5/1966 | Schottler | |
| 4,593,574 A * | 6/1986 | Sinn et al. ................ | 475/189 |
| 4,667,525 A * | 5/1987 | Schottler .................... | 475/115 |

FOREIGN PATENT DOCUMENTS

| | | |
|---|---|---|
| FR | 2 311 233 | 12/1976 |
| GB | 821860 | 10/1959 |
| GB | 2 339 863 A | 2/2000 |
| GB | 2 394 519 A | 4/2004 |
| JP | 2002-513889 | 5/2002 |
| JP | 2006-037989 | 2/2006 |
| WO | WO 01/02751 A1 | 1/2001 |

OTHER PUBLICATIONS

European Search Report; Date of Mailing Apr. 7, 2006; 6 pages.

* cited by examiner

*Primary Examiner*—Dirk Wright
(74) *Attorney, Agent, or Firm*—Knobbe, Martens, Olson & Bear, LLP

(57) ABSTRACT

A continuously variable transmission features an inner ring and an outer ring. Each of the inner ring and the outer ring is split into a first portion and a second portion. At least two balls are positioned between the inner ring and the outer ring. The at least two balls also are positioned between the first and second portions of the inner and outer ring. The at least two balls rotate with rotation of the input shaft. As the distance between the first and second portions of the outer ring changes, the at least two balls move to a smaller radius of travel or a larger radius of travel. The rotation of the balls is transmitted to an output shaft. The input shaft and the output shaft are directly connectable through a one-way clutch to allow engine braking and/or push starting of the associated engine. A dedicated lubrication system also can be provided.

17 Claims, 17 Drawing Sheets

CONTINUOUSLY VARIABLE TRANSMISSION AND ENGINE

CROSS-REFERENCE TO RELATED APPLICATIONS

This application is based upon Japanese Patent Application No. 2004-214381, which was filed on Jul. 22, 2004 and which is hereby incorporated by reference in its entirety.

BACKGROUND OF THE INVENTION

1. Field of the Invention

The present invention generally relates to a continuously variable transmission. More particularly, the present invention relates to a small vehicle, such as a motorcycle or small all-terrain four-wheel vehicle, for example, having a continuously variable transmission.

2. Description of the Related Art

In small scooter-style motor vehicles, a rubber V-belt continuously variable transmission is used to transmit power from an engine to the drive wheel. The rubber V-belt is entrained around a driving pulley, which is mounted to the crankshaft, and a driven pulley, which is in mechanical communication with the drive wheel, which is usually the rear wheel. The power of the engine is transmitted to the rear wheel by the V-belt. Each of the driving pulley and driven pulley has of a fixed sheave located on one side in an axial direction of the shaft on which it is mounted and a movable sheave on the other side.

The movable sheave of the driving pulley moves in the axial direction when a centrifugal roller is moved in the radial direction, and the movable sheave of the driven pulley is urged toward the fixed sheave by a compression coil spring. Thus, centrifugal movement of the roller, which is a function of shaft speed, closes the driving pulley while the spring force closes the driven pulley. When the driving pulley is closed, the driven pulley opens and when the driving pulley slows in rotational speed, the driven pulley closes, which opens the driving pulley. In a continuously variable transmission of this type, when the movable sheaves move in the axial direction, the diameter at which the V-belt engages with the pulleys varies and the transmission ratio is continuously varied. In the closed position, the diameter is larger than the diameter in the open position.

Unfortunately, transmissions using rubber V-belts have operational characteristics that limit the horsepower of the engines with which they have utility. In other words, the rubber V-belts have a limited transmission capacity.

The transmission capacity can be increased through the use of a steel belt instead of the rubber V-belt. Steel belts, however, require strengthening of most, if not all, of the rotating parts because of the tension required for the belts and because of the increased weight of the belts. Thus, while steel belts can increase the transmission capacity, the steel belts disadvantageously raise the weight and size of the transmission.

Other forms of continuously variable transmission include torque converter-type transmissions used in passenger cars, toroidal-type transmissions in which an axial angle variable roller is interposed between power transmitting faces opposed to each other, and ball-type continuously variable transmissions, which are discussed below.

Because the torque converter-type and toroidal-type continuously variable transmissions are larger in size and weight than belt-type continuously variable transmissions, they seldom are mounted on small vehicles, such as motorcycles, that require ease in handling.

Japanese Patent Publication No. JP-A2002-513889 (FIG. 1) discloses a ball-type continuously variable transmission. The continuously variable transmission disclosed in the reference has an inner ring mounted on an input shaft, an outer ring located radially outside the inner ring, and a plurality of transmitting balls held between the inner and outer rings. The balls roll between the inner and outer ring.

Each of the inner and outer rings has a first half and a second half that are aligned in the axial direction. In other words, the inner ring has a first half that is generally axially aligned with a first half of the outer ring and the out inner ring has a second half that is generally axially aligned with a second half of the outer ring. Each of the first and second halves of the inner and outer rings defines a concave surface extending in the circumferential direction on which the balls are rolled. The concave surfaces of the first and second halves of the inner ring are so shaped that they form an annular groove with a U-shaped cross-section which opens radially outward when one of the halves comes close to the other half. The concave surfaces of the first and second halves of the outer ring are so shaped that they form an annular groove with a U-shaped cross-section which opens radially inward when one of the halves comes close to the other half.

The first half of the inner ring is secured to an input shaft. The second half of the inner ring is connected to the input shaft or the first half via a guide mechanism that converts rotational motion to reciprocating motion, such as a ball screw, and is urged toward the first half.

The halves of the outer ring are supported by a transmission casing and are rotationally fixed relative to the inner ring. That is, when the inner ring rotates together with the input shaft, the balls roll on the concave surfaces of the outer ring and rotate around the axis of the input shaft in the same direction as the rotating direction of the inner ring.

The first and second halves of the outer ring are connected, as in the case with the halves of the inner rings, via a guide mechanism that converts rotational motion to reciprocating motion, such as a ball screw, in such a manner that the distance between the two halves of the outer ring can be varied. A speed changing lever is attached to the first half of the outer ring. The speed changing lever protrudes from the first half of the outer ring. When the first half is rotated with respect to the second half by the speed changing lever, the distance between the halves of the outer ring is increased or decreased. For example, when the distance between the halves of the outer ring is decreased by operating the speed changing lever, the transmitting balls are pressed toward the inner ring by the halves of the outer ring and the second half of the inner ring is moved away from the first half against the elastic force of the spring. As a result, the radius of rotation of the balls around the axis of the input shaft is decreased.

A plurality of transmitting balls are interposed between the inner and outer rings and are in contact with a plurality of driven rollers interposed between the balls. The driven rollers are supported on an axial end of a roller supporting member. The roller supporting member is rotatable about the axis of the input shaft. That is, when the balls rotate around the axis of the input shaft, the driven rollers are pressed by the balls and the roller supporting member is rotated about the axis of the input shaft. An output shaft is connected to an end of the roller supporting member.

When the driven rollers rotate around the axis of the input shaft together with the transmitting balls, the output shaft is rotates with the driven rollers. Even if the rotational speed of the input shaft is constant, the rotational speed of the output shaft can be decreased by decreasing the radius of rotation of the transmitting balls and can be increased by increasing the radius of rotation of the transmitting balls around the axis of the input shaft. Thus, the rotational speed of the output shaft can be increased or decreased by operating the speed changing lever even if the rotational speed of the input shaft is constant.

SUMMARY OF THE INVENTION

The ball-type continuously variable transmission such as that described above can be small enough in size and weight for use on small motorized vehicles. However, the arrangement disclosed in the Japanese reference described above is not believed to allow engine braking or push starting of the engine. For example, when a driving force is applied to the output shaft of the ball-type continuously variable transmission from the driven wheel, the driven rollers press the balls, which causes the balls to slip between the inner and outer rings. Furthermore, the balls and the inner and outer rings, on which the balls are rolled, must be fully lubricated to reduce any temperature rise or wear of the balls due to the increase of transmission torque when a push start is attempted.

Thus, a ball-type continuously variable transmission is desired that allows engine braking and push-starting. A ball-type continuously variable transmission also is desired that features an improved lubrication construction.

One aspect of the present invention involves an engine and continuously variable transmission assembly comprising a continuously variable transmission. The transmission comprises a transmission input shaft having an axial direction. The transmission input shaft is coupled to an engine crankshaft. The transmission input shaft receives rotation from the engine crankshaft. An inner ring comprises a first half and a second half. The inner ring first half and the inner ring second half are generally aligned in the axial direction of the transmission input shaft. The inner ring first half and the inner ring second half are joined for rotation with the transmission input shaft. An outer ring comprises a first half and a second half with the outer ring first half and the outer ring second half being located radially outward from the inner ring. The outer ring first half and the outer ring second half are generally aligned in the axial direction of the transmission input shaft. The outer ring first half and the outer ring second half are generally restrained from rotating around the axis of the transmission input shaft. Transmitting balls are rollable between the inner ring and the outer ring. Driven rollers are interposed between the transmitting balls and are in contact with the transmitting balls. A roller supporting member carries the driven rollers. The roller supporting member is rotatable around the axis of the transmission input shaft. A transmission output shaft is connected to the roller supporting member and a wheel driving transmission member. The transmission output shaft is rotatable around the axis of the transmission input shaft. A speed changing mechanism is coupled to the outer ring such that the distance between the first outer ring half and the second outer ring half can be adjusted with adjustment of the distance between the first outer ring half and the second outer ring half varying the rotational speed of the driven rollers around the inner ring. The transmission output shaft has a generally cylindrical portion. The transmission input shaft extends at least partway into the generally cylindrical portion. A one-way clutch connects the transmission output shaft and the transmission input shaft. The one-way clutch is positioned within the generally cylindrical portion.

Another aspect of the present invention involves an engine and continuously variable transmission assembly comprising a continuously variable transmission. The transmission comprises a transmission input shaft that has an axial direction. The transmission input shaft is driven by an engine crankshaft. An inner ring is mounted to the transmission input shaft. The inner ring comprises a first half and a second half. At least two balls are positioned between the first half and the second half of the inner ring. The inner ring first half and the inner ring second half are joined for rotation with the transmission input shaft. The at least two balls also are positioned between the inner ring and an outer ring. The outer ring comprises a first half and a second half. The at least two balls are positioned between the outer ring first half and the outer ring second half. A roller is interposed between two adjacent balls of the at least two balls. The roller contacts both of the adjacent balls. The roller is mounted on a roller supporting member. The roller supporting member is rotatable around the axis of the transmission input shaft. A transmission output shaft is connected to the roller supporting member. A wheel driving transmission member is connected to the transmission output shaft. The transmission output shaft is rotatable around the axis of the transmission input shaft. A one-way clutch connects the transmission input shaft and the transmission output shaft. A speed changing mechanism is coupled to the outer ring such that the distance between the first outer ring half and the second outer ring half can be adjusted with adjustment of the distance between the first outer ring half and the second outer ring half varying the rotational speed of the roller around the inner ring.

BRIEF DESCRIPTION OF THE DRAWINGS

These and other features, aspects and advantages of the present invention will now be described with reference to the drawings of several preferred embodiments, which embodiments are intended to illustrate and not to limit the invention. The drawings comprise 17 figures.

DETAILED DESCRIPTION OF THE PREFERRED EMBODIMENT

With reference now to FIGS. 1-9, an embodiment of a continuously variable transmission 1 that is arranged and configured in accordance with certain features, aspects and advantages of the present invention is illustrated. The continuously variable transmission 1 can be interposed between a clutch of an engine for a motorcycle (not shown) and a chain sprocket 2 for driving a rear wheel. In most configurations, the clutch has an input part in meshing engagement with a crankshaft and an output part that can be coupled to and uncoupled from the input part. The clutch also has a clutch shaft. In the illustrated embodiment, the clutch shaft is shown as an engine drive shaft.

The clutch shaft preferably is disposed generally parallel to the crankshaft and can be in meshing engagement with an input shaft 3 of the continuously variable transmission 1 via a speed reduction gear (not shown). The input shaft 3 may comprise the clutch shaft itself. In such a configuration, the continuously variable transmission 1 is directly connected to the clutch shaft. The chain sprocket 2 can be connected to a rear wheel-side sprocket (not shown) via a chain. The chain sprocket 2 comprises a wheel driving transmission member.

Figure 1:
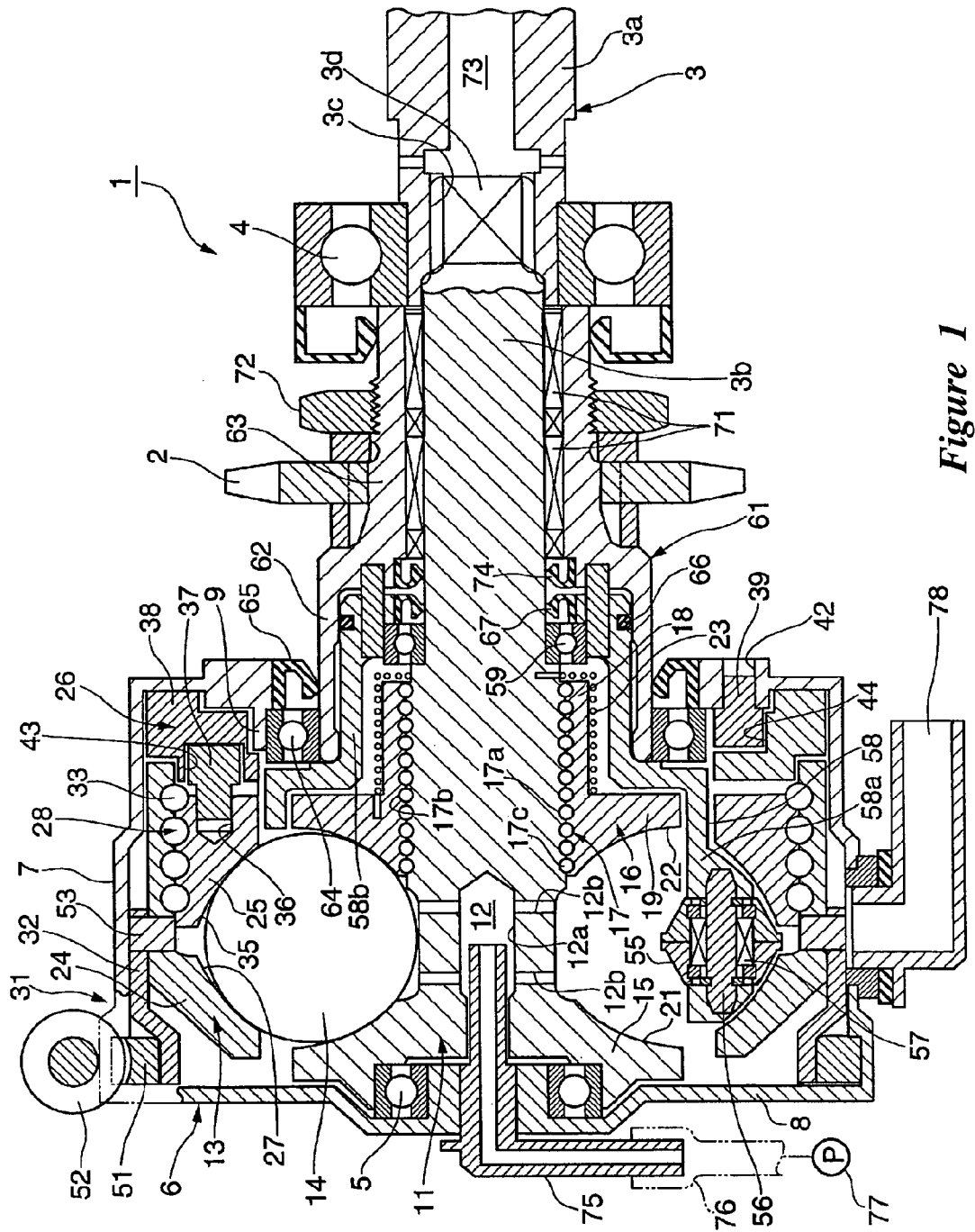
FIG. 1 is vertical cross-sectional view of a continuously variable transmission that is arranged and configured in accordance with certain features, aspects and advantages of the present invention.

With reference to FIG. 1, the illustrated input shaft 3 of the continuously variable transmission 1 has a first input shaft 3a and a second input shaft 3b. The first input shaft 3a can be in meshing engagement with the clutch shaft. The second input shaft 3b preferably is disposed coaxially with the first input shaft 3a as shown in FIG. 1. The connection of the first and second input shafts 3a and 3b can be established in any suitable manner, such as, for example but without limitation, by fitting a square column part 3d on a first end of the second input shaft 3b into a hole 3c with a corresponding square cross-section formed in an end of the first input shaft 3a such that the first and second input shafts 3a and 3b are rotatable together. In other configurations, a splined coupling or the like also can be used. The joint of the first and second input shafts 3a and 3b can be rotatably supported on a transmission case (not shown) of the engine via a bearing 4.

Figure 5:
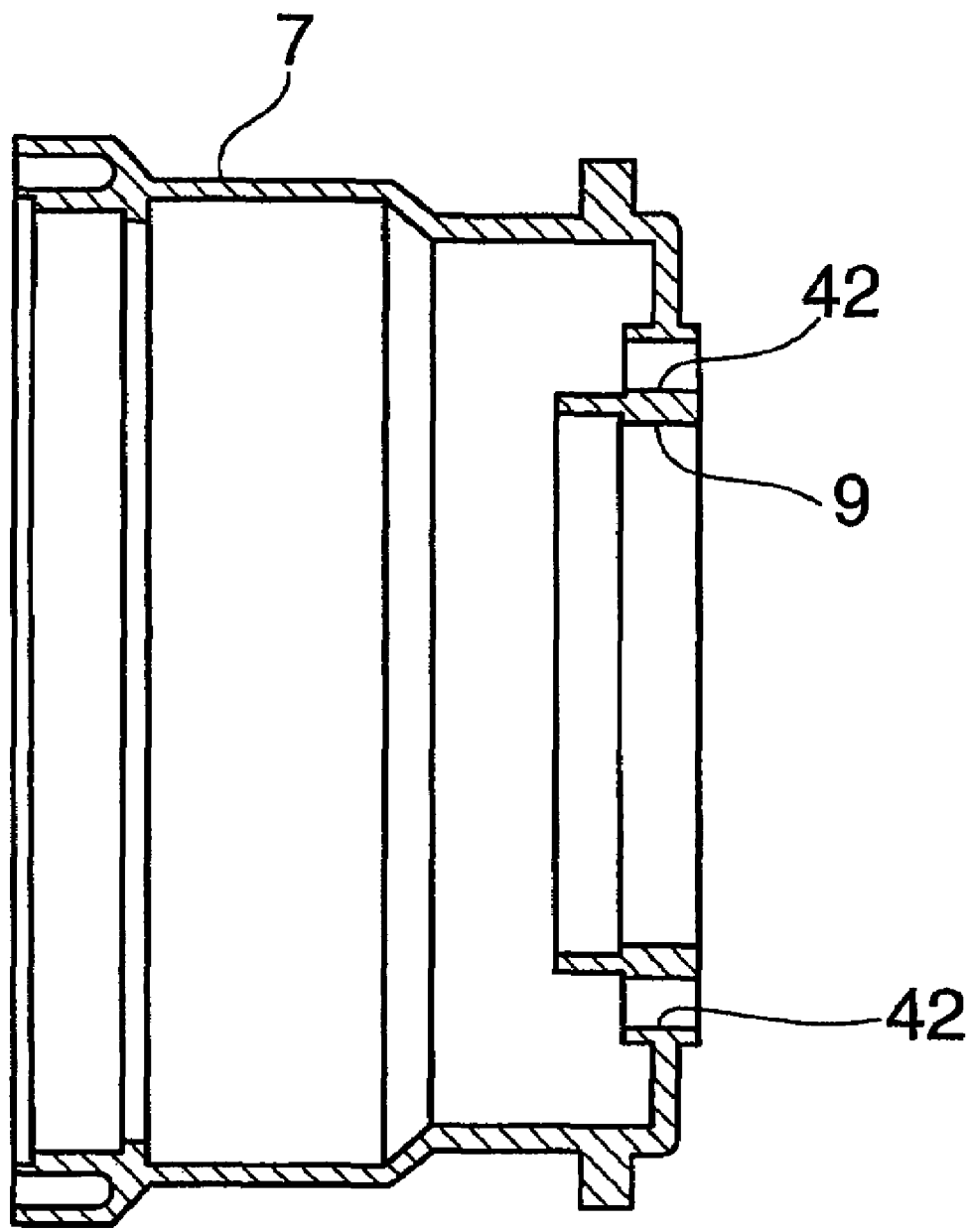
FIG. 5 is a cross-sectional view taken along the line V-V in FIG. 4.

The second end of the second input shaft 3b (i.e., the end opposite the first input shaft 3a) can be rotatably supported on a transmission housing 6 via a bearing 5. The transmission housing 6, which generally houses the components of a transmission, can comprise a generally cylindrical housing body 7 (see FIGS. 1, 4 and 5) and a lid 8 that closes an opening formed at a second end of the housing body 7. In one configuration, the housing 6 is supported by a crankcase cover (not shown). As shown in FIGS. 1 and 5, an inner cylinder 9 can be formed integrally with a first end of the housing body 7. The bearing 5 for supporting the second end of the second input shaft 3b can be supported by the lid 8.

An inner ring 11 can be formed on, or coupled to, the second end of the second input shaft 3b. A lubricant passage 12 can also be formed in the second end of the second input shaft 3b. The inner ring 11 supports transmitting balls 14 in conjunction with an outer ring 13. The illustrated inner ring 11 comprises a first inner ring half 15 and a second inner ring half 16 that are generally aligned in the axial direction of the second input shaft 3b.

The first inner ring half 15 preferably is a disk formed integrally with an end of the second input shaft 3b. The second inner ring half 16 preferably comprises a generally cylindrical boss 18 and a disk 19. In the illustrated configurations, the cylindrical boss 18 and the disk 19 are integrally formed with the disk 19 being positioned on the side of the first inner ring half 15. The illustrated cylindrical boss 18 is supported on the second input shaft 3b by a ball screw mechanism 17.

The ball screw mechanism 17 comprises multiple balls 17c that roll within generally spiral grooves 17a, 17b. The grooves 17a, 17b are formed along the inner peripheral surface of the boss 18 of the second inner ring half 16 and along the outer peripheral surface of the second input shaft 3b, respectively.

In the illustrated configuration, the opposed faces of the first and second inner ring halves 15, 16 have respective generally concave surfaces 21, 22 that extend in the circumferential direction of the inner ring halves 15, 16. The concave surfaces 21, 22 define side walls of a ball rolling groove. Preferably, the concave surfaces 21, 22 are shaped such that the width of the ball rolling groove gradually increases as the radial distance from the axis of the second input shaft 3b increases.

In the illustrated embodiment, one end of a torsion spring 23 is engaged with the second inner ring half 16 while the other end of the torsion spring 23 is engaged with the second input shaft 3b. Thus, the second inner ring half 16 is urged to rotation about the axis of the second input shaft 3b by the torsion spring 23. In particular, the second inner ring half 16 preferably is urged by the torsion spring 23 in the direction that moves the second inner ring half 16 toward the first inner ring half 15. In other words, due to the relative rotation between the ring half 16 and the second input shaft 3b, the ball screw mechanism 17 moves the second inner ring half 16 toward the first inner ring half 15. Because of this movement, the concave surfaces 21, 22 of the inner ring halves 15, 16 squeeze the balls 14 from both sides in the axial direction and the concave surfaces 21, 22 function substantially as a cam that presses the balls 14 radially outward. The radial outward movement of the balls 14 is restrained by the outer ring 13, which is located radially outside the inner ring 11.

The illustrated outer ring 13 comprises a first outer ring half 24 and a second outer ring half 25 that are generally aligned in the axial direction of the second input shaft 3b. The two halves 24, 25 preferably are supported by the housing body 7 via an aligning mechanism 26, which is connected to an end of the second outer ring half 25 as shown in FIG. 1.

In the illustrated configuration, the first outer ring half 24 has a generally cylindrical shape and has a ball rolling concave surface 27 at an axial end of its inner periphery. Other configurations also can be used. The second outer ring half 25 is connected to the other end of the inner periphery of the first outer ring half 24 via a ball screw mechanism 28. In some configurations, the first outer ring half 24 is supported by the second outer ring half 25 via the ball screw mechanism 28. A generally cylindrical slider 32 forms a part of a speed changing means 31, which is described later, and can be fitted over the outer periphery of the first outer ring half 24.

Figure 6:
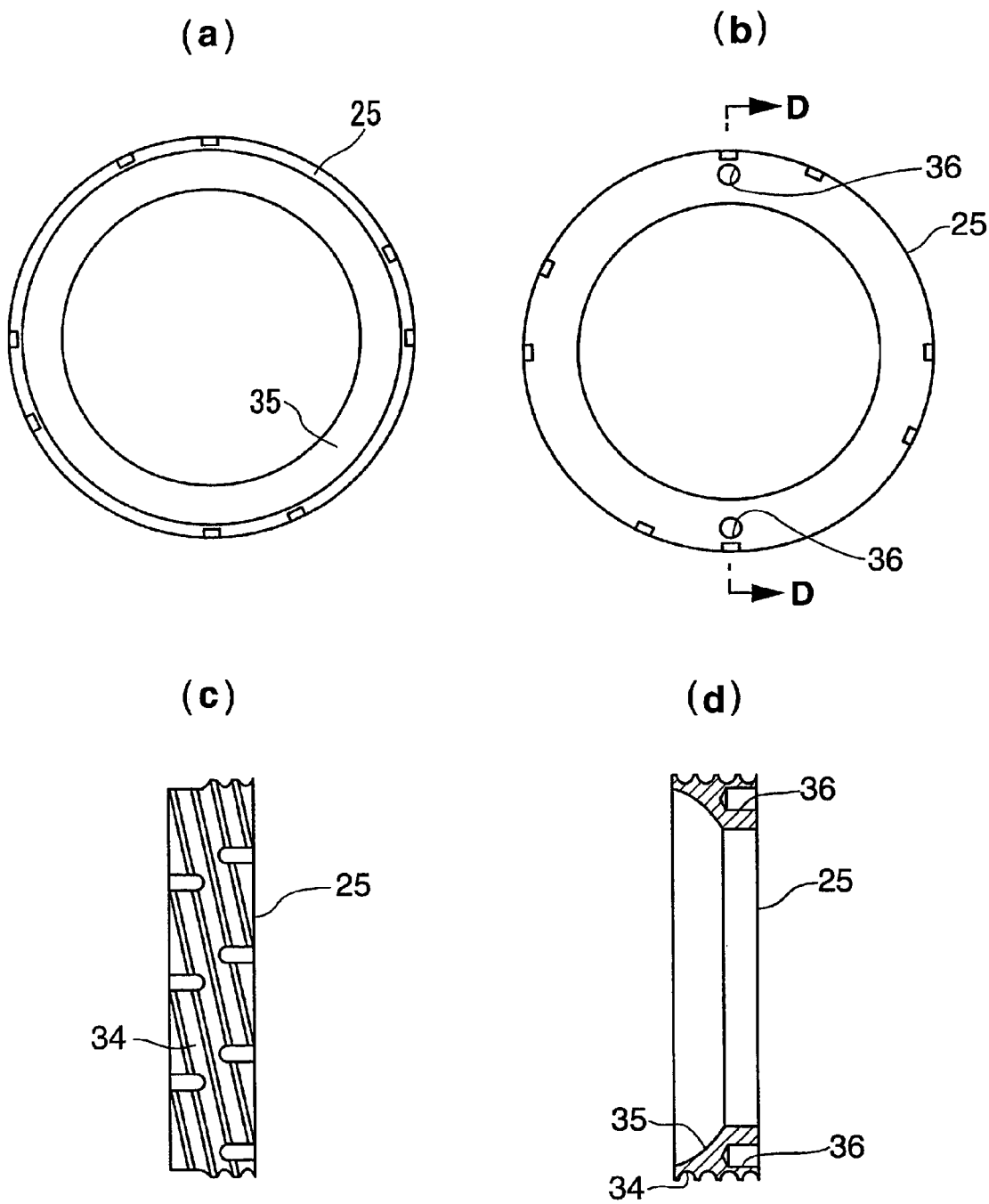
FIGS. 6(a)-6(d) are views of a first outer ring, in which (a) is a front view seen from the side of the balls, (b) is a rear view, (c) is a side view, and (d) is a cross-sectional view taken along the line D-D in FIG. 6(b).
Figure 9:
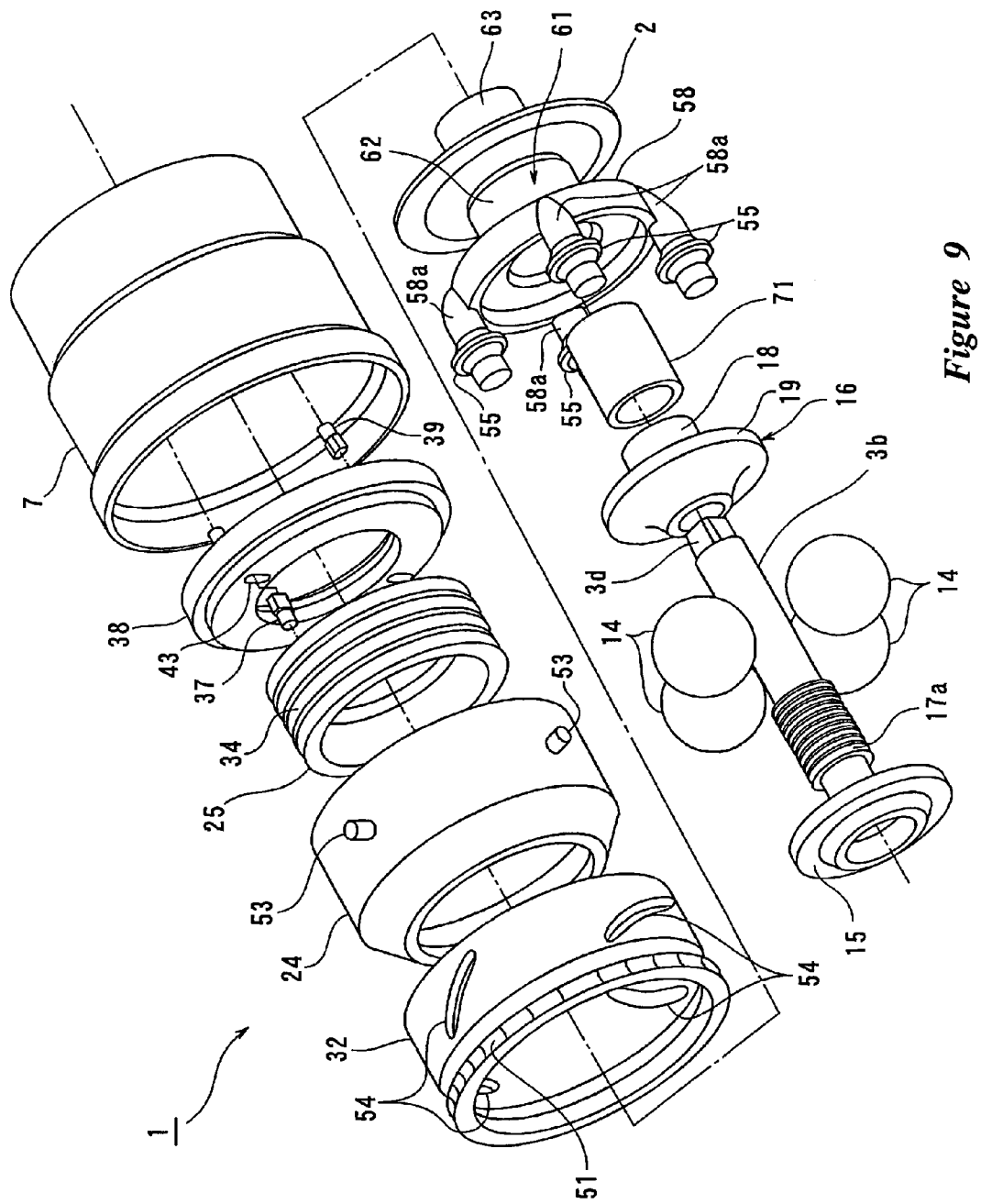
FIG. 9 is an exploded perspective view of the transmission of FIG. 1.

With reference now to FIGS. 6 and 9, the second outer ring half 25, which can comprise a generally annular shape, preferably comprises a generally spiral groove 34 in its outer periphery for receiving balls 33 of the ball screw mechanism 28 (see FIG. 1) and a generally concave surface 35 that is generally opposed to the generally concave surface 27 of the first outer ring half 24. The generally concave surface 35 of the second outer ring half 25 and the generally concave surface 27 of the first outer ring half 24 form side walls of a ball rolling groove and are so shaped that the width of the ball rolling groove gradually increases as the radial distance to the axis of the second input shaft 3b decreases. As shown in FIGS. 1 and 6(d), the illustrated second outer ring half 25 preferably comprises pin bores 36 that can be used to connect the aligning mechanism 26. In the illustrated embodiment, the aligning mechanism 26 is connected at the end of the outer ring half 25 generally opposite the balls 14.

The illustrated aligning mechanism 26 advantageously connects the first and second outer ring halves 24, 25 to the housing body 7 for movement. The mechanism 26 comprises first aligning pins 37 that are received in corresponding pin bores 36 of the second outer ring half 25. The mechanism 26 also comprises an aligning disk 38 that is connected to the second outer ring half 25 via the aligning pins 37. Moreover, the illustrated mechanism 26 preferably comprises second aligning pins 39 that connect the aligning disk 38 to the housing body 7.

Figure 7:
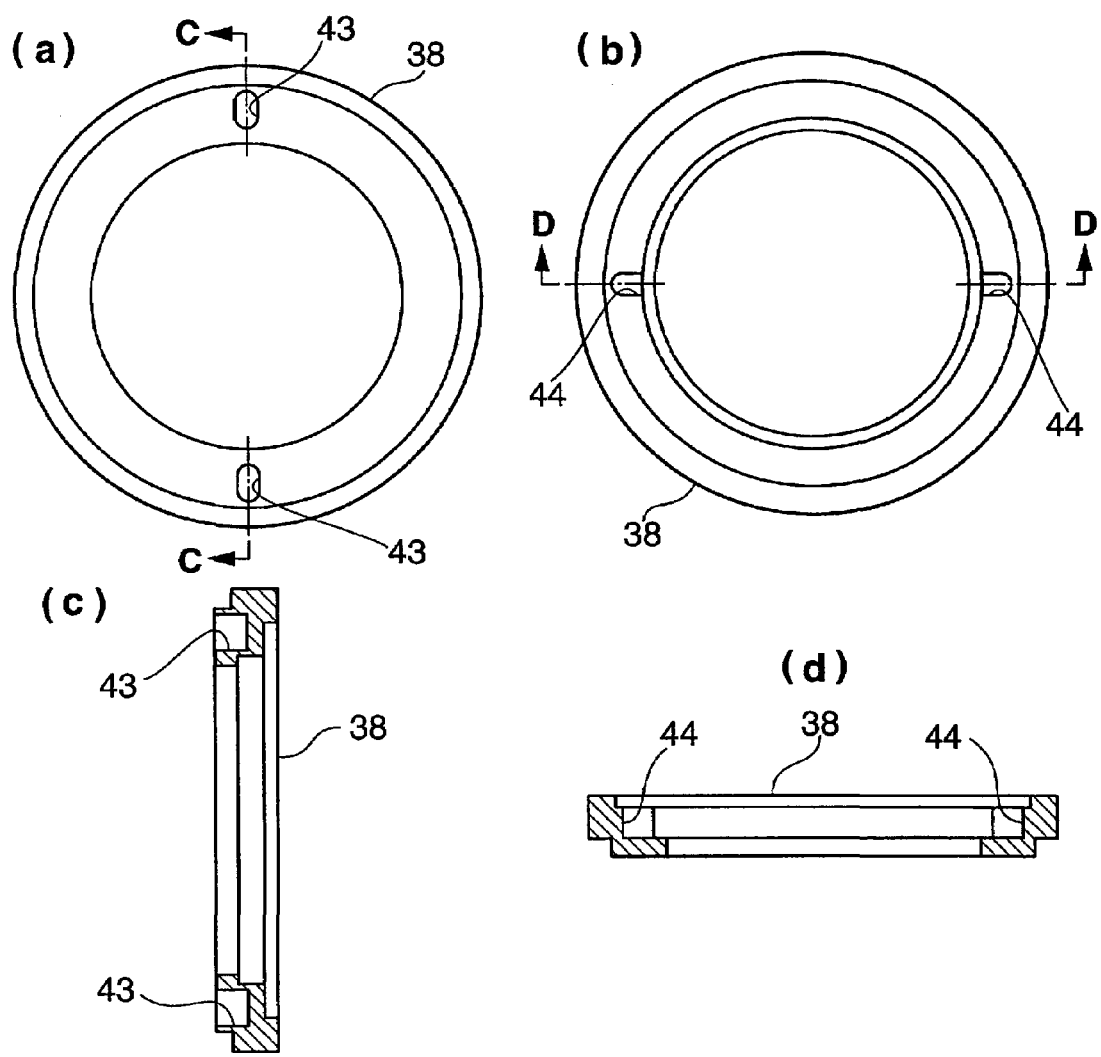
FIGS. 7(a)-7(d) are views of an aligning disk, in which (a) is a front view seen from the side of balls, (b) is a rear view, (c) is a cross-sectional view taken along the line C-C in FIGS. 7(a), and (d) is a cross-sectional view taken along the line D-D in FIG. 7(b).
Figure 8:
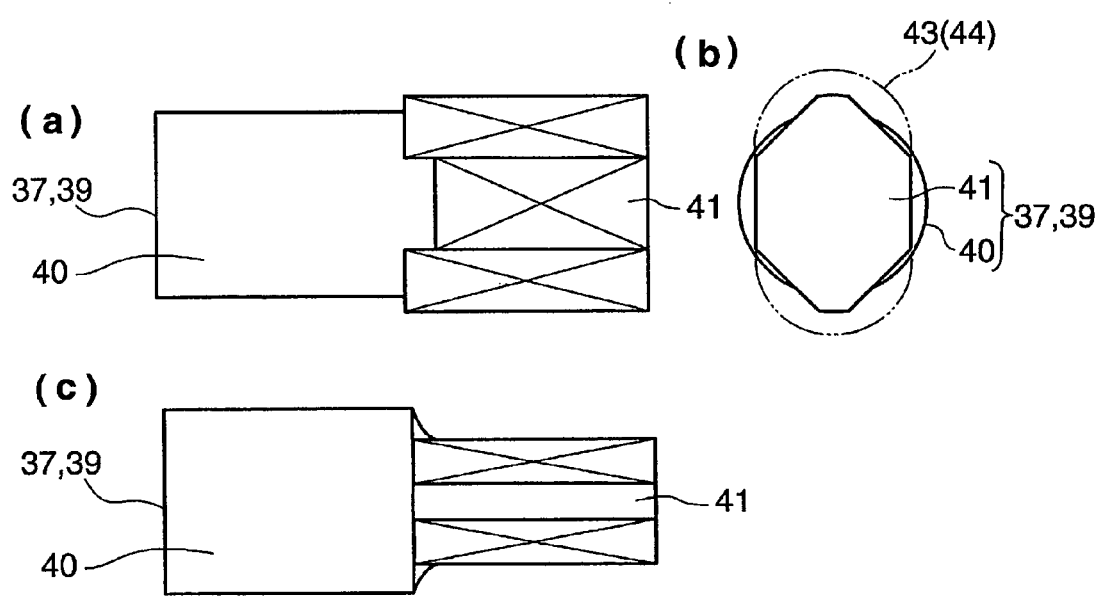
FIGS. 8(a)-8(c) are views of an aligning pin, in which (a) is a side view, (b) is a rear view, and (c) is a bottom view.

In the illustrated embodiment, each of the first and second aligning pins 37, 39 preferably has a generally cylindrical column portion 40 and a generally prismatic column portion 41 as shown in FIG. 8. The generally cylindrical column portion 40 has a generally cylindrical column shape movably receivable in the pin bore 36 of the second outer ring half 25 and the pin bore 42 of the housing body 7 (see FIGS. 1, 4 and 5). The generally prismatic column portion 41 can have any suitable configuration but has a vertically elongated honeycomb pattern in the illustrated configuration, as shown in FIG. 8(b). The generally prismatic column portion 41 can be received in slots 43 and slot-like notches 44 of the aligning disk 38, such as that shown in FIG. 7.

In the illustrated embodiment, the slots 43 are formed in the end of the aligning disk 38 opposed to the second outer ring half 25 as shown in FIGS. 7(a) and (c). The slots 43 open toward the second outer ring half 25 at diametrically opposite positions on the aligning disk 38 (top and bottom in FIG. 7) and are elongated in a radial direction of the aligning disk 38. Thus, the slots 43 accommodate radial movement.

The slot-like notches 44 in the aligning disk 38 are formed in the other end of the aligning disk 38 at two positions that are offset from the slots 43 (horizontal direction in FIG. 7) as viewed in the axial direction. The slot-like notches 44 are elongated in a radial direction of the aligning disk 38 as shown in FIGS. 7(b) and (c).

The slots 43 and the slot-like notches 44 have such an opening size that the prismatic column portions 41 of the first and second aligning pins 37 and 39 are movable in the longitudinal direction of the slots but are generally restrained in the transverse direction (see FIG. 8(b)).

In the illustrated aligning mechanism 26, the aligning disk 38 is supported by the housing body 7 for movement in the longitudinal direction of the slot-like notches 44 (horizontal direction in FIG. 7(b)), and the second outer ring half 25 is supported by the aligning disk 38 for movement in the longitudinal direction of the slots 43 (vertical direction in FIG. 7(a)). Thus, because the second outer ring half 25 is supported by the housing body 7 via the aligning mechanism 26, the second outer ring half 25 is supported in such a manner that it is movable in two radial directions perpendicular to each other with respect to the housing body 7 but restrained from rotating about the axis of the second input shaft 3b. Because the first outer ring half 24 is integrally attached to the second outer ring half 25 via the ball screw mechanism 28, the outer ring 13 constituted of the halves 24, 25 advantageously is movable in the above two directions.

Because the outer ring 13 is movable as described directly above, when the balls 14 rotate around the axis of the second input shaft 3b between the inner ring 11 and the outer ring 13, the axis of the outer ring 13 and the center of rotation of the balls 14 (the axis of the second input shaft 3b) can be maintained substantially coincident. Also, because the second outer ring half 25 can move in the axial direction with respect to the first aligning pins 37, the outer ring 13 can be positioned in the axial direction such that the balls 14 can be properly in contact with the outer ring halves 24, 25 in the illustrated configuration. The distance between the concave surfaces 27, 35 of the outer ring halves 24, 25 can be increased and decreased by the speed changing means 31, which is described below.

The speed changing means 31 comprises the slider 32, which is fitted over the first outer ring half 24, a worm wheel 51 that is provided on an axial outer end of the slider 32, and a speed changing motor (not shown) that has a worm 52 in meshing engagement with the worm wheel 51. The speed changing motor can be supported by the transmission housing 6 in the illustrated configuration.

In the illustrated arrangement, the slider 32 fits over the outer periphery of the first outer ring half 24. The slider 32 is moveable relative to the outer ring half 24 and preferably comprises cam grooves 54 (see FIG. 9). The cam grooves 54 preferably receive pins that function generally as cam followers 53. The illustrated pins 53 protrude from the first outer ring half 24. The cam grooves 54 can be formed generally spirally so that when the slider 32 is rotated circumferentially by the worm wheel 51 and the worm 52, the cam followers 53 and the first outer ring half 24 can be rotated in the circumferential direction and moved in the axial direction.

Because the second outer ring half 25 of the first and second outer ring halves 24, 25 is restrained from rotating by the aligning mechanism 26 and the housing body 7, when torque is transmitted from the slider 32 to the first outer ring half 24 via the cam followers 53, the first outer ring half 24 is rotated with respect to the second outer ring half 25. When the first outer ring half 24 is rotated as described above, the rotation thereof is converted to reciprocating motion in the axial directions by the ball screw mechanism 28 and transmitted to the second outer ring half 25 to move the second outer ring half 25 in an axial direction. Thus, the first outer ring half 24 is moved in one axial direction and the second outer ring half 25 is moved in the other axial direction so that the balls 14 can be pressed against the concave surface 27 of the first outer ring half 24 and the concave surface 35 of the second outer ring half 25 evenly.

As described above, since the distance between the concave surface 27 of the first outer ring half 24 and the concave surface 35 of the second outer ring half 25 is varied when the first outer ring half 24 and the second outer ring half 25 are moved in the opposite directions along the axial direction, the turning radius of the balls 14 around the axis of the second input shaft 3b between the inner ring 11 and the outer ring 13 is varied. For example, when the distance between two concave surfaces 27, 35 of the outer wheel 13 is decreased, the distance between two concave surfaces 21 and 22 of the inner ring 11 is increased and the turning radius of the balls 14 is relatively decreased. If the movement of the two concave surfaces 27, 35 is in the other direction, the turning radius of the balls 14 is increased. The position of the center of one of the balls 14 at the time when the distance between the concave surfaces 27 and 35 of the outer ring 13 is minimized is indicated as C1 in FIG. 2, and the position of the center of the ball 14 at the time when the distance between the concave surfaces 27 and 35 of the outer ring 13 is maximized is indicated as C2 in FIG. 2.

Figure 2:
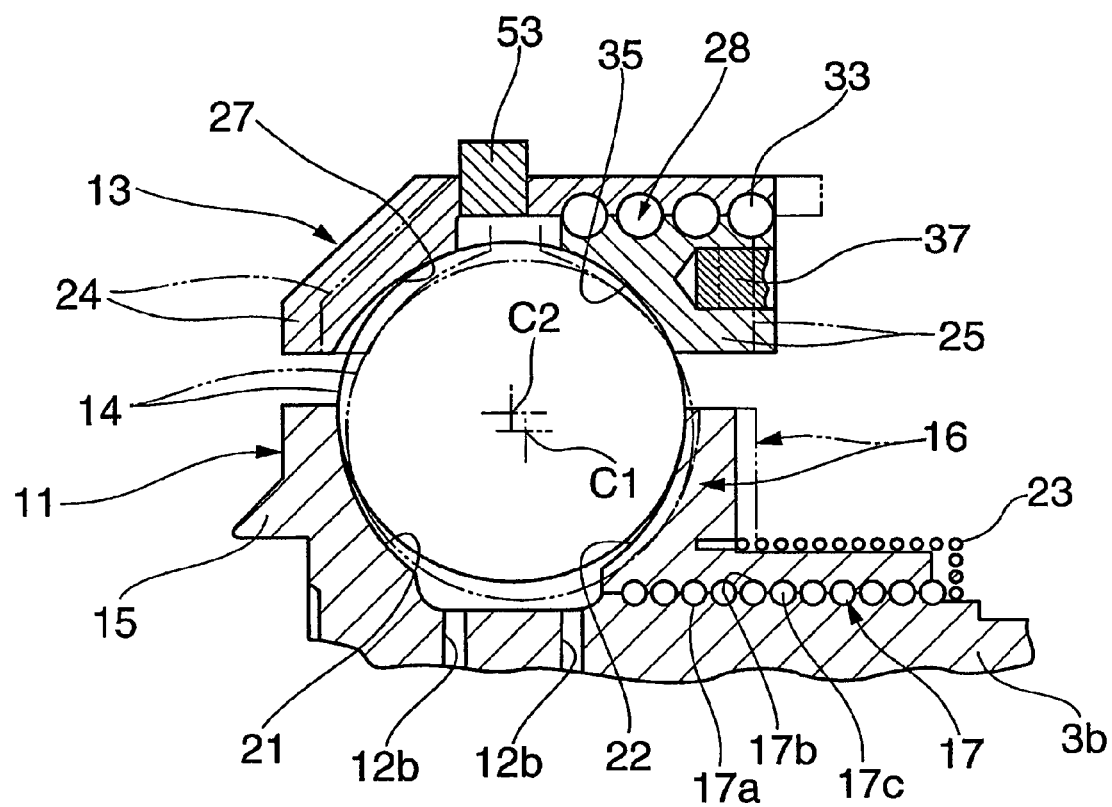
FIG. 2 is an enlarged cross-sectional view of a portion of the transmission of FIG. 1 and illustrating a ball at the time when the speed reduction ratio is small.
Figure 3:
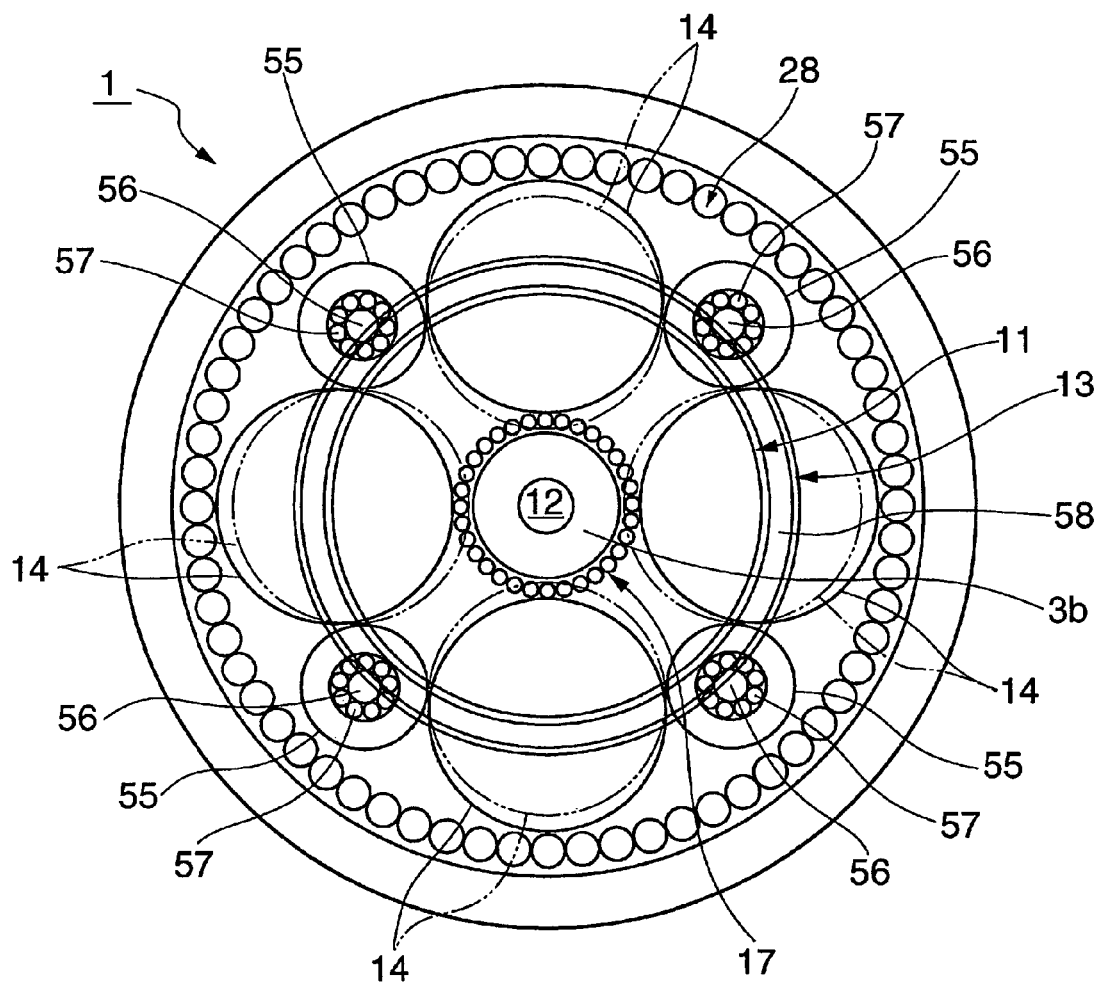
FIG. 3 is a schematic illustration showing a relationship of components featured in the transmission of FIG. 1.
Figure 4:
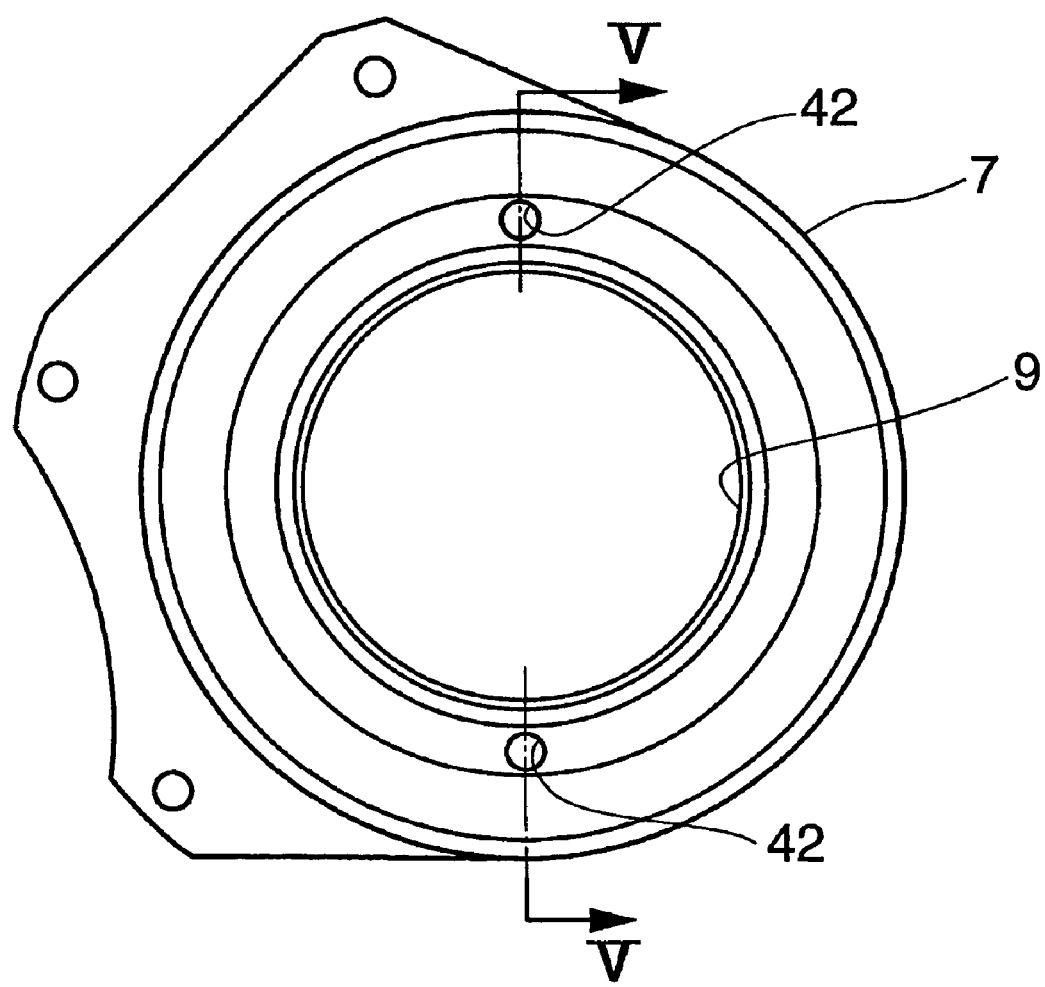
FIG. 4 is a front view of a housing used in the transmission of FIG. 1.

That is, when the distance between the concave surfaces 27, 35 of the outer ring 13 is increased from its minimum to its maximum, the center of rotation of each of the balls 14 at the time when the balls 14 are rotated around the axis of the second input shaft 3b are changed continuously from the center position C1 to the center position C2. FIG. 1 shows the state in which the distance between the two concave surfaces 27, 35 of the outer ring 13 is minimized, and FIGS. 2 and 3 show the state in which the distance between the two concave surfaces 27, 35 of the outer ring 13 is maximized. In FIGS. 2 and 3, the state in which the distance between the two concave surfaces 27, 35 of the outer ring 13 is minimized is shown by double-dot-dash lines (in FIG. 3, the positions of the balls 14 are shown).

As shown in FIG. 3, four balls 14 are disposed circumferentially around the second input shaft 3b at equal intervals. Other suitable numbers of ball 14 also can be used. The balls 14 preferably are in contact with driven rollers 55 interposed between the balls 14.

The driven rollers 55 preferably have a generally disk shape with an axis generally parallel to the axis of the second input shaft 3b. The driven rollers 55 also preferably are rotatably supported by bearings 57 via support shafts 56 that extend generally through the centers of the driven rollers 55 and that are supported by a roller supporting member 58, which is described later (see FIGS. 1 and 9). The driven rollers 55 can be located at positions corresponding to the centers of the balls 14 in the axial direction of the second input shaft 3b as shown in FIG. 1. In the illustrated configuration, each of the driven rollers 55 is in contact with adjacent two balls 14 as shown in FIG. 3.

The illustrated roller supporting member 58 has four arms 58a for supporting the support shafts 56 for the driven rollers 55 and a generally cylindrical body 58b for supporting one end of each of the arms 58b in a cantilever fashion as shown in FIGS. 1 and 9. Other suitable constructions also can be used. The end of the generally cylindrical body 58b opposite the arms 58a preferably is rotatably supported on the second input shaft 3b by a bearing 59. The generally cylindrical body 58b preferably also is connected to a generally cylindrical output shaft 61, which is described below.

The illustrated generally cylindrical output shaft 61 has a large-diameter portion 62 that fits over the outer periphery of the generally cylindrical body 58b and a small-diameter portion 63 that axially protrudes from an end of the large-diameter portion 62 opposite the balls 14. The small-diameter portion 63 can be attached to the second input shaft 3b, which extends through the small-diameter portion. The illustrated small-diameter portion 63 comprises a generally cylindrical portion of an output shaft in the present invention. The other end of the large-diameter portion 62 (the end on the side of the balls 14) preferably is rotatably supported by the inner cylinder 9 of the housing body 7 via a bearing 64.

In the illustrated configuration, an oil seal 65 is interposed between the inner periphery of the part of the inner cylinder 9 located outside the bearing 64 and the outer periphery of the large-diameter portion 62. An O-ring 66 can be interposed between the large-diameter portion 62 of the generally cylindrical output shaft 61 and the generally cylindrical body 58b of the roller supporting member 58. Also, an oil seal 67 can be interposed between an end of the generally cylindrical body 58b and the second input shaft 3b. The seal members (e.g., the oil seals 65, 67 and the O-ring 66) substantially seal the joint between the transmission housing 6 and the input and output shafts.

The inner periphery of the small-diameter portion 63 of the generally cylindrical output shaft 61 can be connected to the second input shaft 3b via a one-way clutch 71. The one-way clutch 71 generally does not transmit power from the second input shaft 3b to the small-diameter portion 63 but is capable of transmitting power from the small-diameter portion 63 to the second input shaft 3b. In the illustrated configuration, a chain sprocket 2 is secured to the outer periphery of the small-diameter portion 63 by a lock nut 72.

One end (the end opposite the balls 14) of a one-way clutch accommodating space defined between the small-diameter portion 63 and the second input shaft 3b advantageously is in fluid communication with a lubricant passage 73 formed in the first input shaft 3a. The fluid communication can be established through a passage defined as a clearance at the joint between the first input shaft 3a and the second input shaft 3b. Some of engine lubricant is supplied to the lubricant passage 73 from a pump (not shown). The other end of the one-way clutch accommodating space can be sealed by a seal 74 that is interposed between the generally cylindrical output shaft 61 and the second input shaft 3b.

The passage 12 formed in the second end of the second input shaft 3b (the end on which the first inner ring half 15 is formed) can be connected to the lubricant delivery port of a lubricating pump 77 exclusively for the transmission through a connection pipe 75 attached to and extending through the lid 8 of the transmission housing 6 and a lubricant hose 76 connected to the pipe 75, as shown in FIG. 1. The lubricant pump 77 for the transmission 77 comprises a lubricant supply device.

The illustrated lubricant passage 12 comprises an axial extension 12a and at least one radial extension 12b. The axial extension 12a is formed in the second input shaft 3b from an end to a position corresponding to the ball rolling groove. The at least one radial extension 12b are connected to the axial extension 12a and open in the outer peripheral surface of the second input shaft 3b. The downstream openings of the radial extensions 12b can be located in the vicinity of the concave surface 21 of the first inner ring half 15 and the concave surface 22 of the second inner ring half 16.

When lubricant is supplied from the pump 77 for the transmission to the lubricant passage 12, the lubricant is directed onto the contact parts of the inner ring 11 and the balls 14 by centrifugal force and, as the balls 14 are rolled, the lubricant adheres to the contact parts of the outer ring 13 and the balls 14 and the contact parts of the balls 14 and the driven rollers 55. As described above, some of the lubricant is splashed radially outward from the balls 14 rotating around the axis of the second input shaft 3b by centrifugal force to lubricate the driven roller supporting bearings 57, the sliding contact parts of the cam followers 53 and the cam grooves 54 of the speed changing means 31, the ball screw mechanism 28 of the outer ring 13, the sliding parts of the aligning pins 37 and the like.

After having lubricated one or more of the components described above, the lubricant drips or flows down to the bottom of the transmission housing 6 and returns to a transmission lubricant storage section (not shown) through a lubricant discharge pipe 78 connected to the bottom of the housing body 7. The lubricant storage section can be connected to the suction port of the lubricant pump 77. The lubricant for the transmission preferably is stored in a lubricating system that is isolated from the engine lubricating system. In such a configuration, the transmission lubricant will not mix with engine lubricant stored in the crankcase of the engine or elsewhere.

In the illustrated configuration, when the first and second input shafts 3a and 3b rotate together with the clutch shaft of the engine, the inner ring 11 rotates and the balls 14 rotate around the axis of the second input shaft 3b between the inner ring 11 and the outer ring 13. When the balls 14 rotate, the balls 14 press the driven rollers 55 adjoining thereto and the driven rollers 55, the roller supporting member 58 and the cylindrical output shaft 61 are rotated together around the axis of the second input shaft 3b. By the rotation of the cylindrical output shaft 61, power is transmitted from the chain sprocket 2 via the chain to the driven wheel.

When the distance between the two concave surfaces 27, 35 of the outer ring 13 is decreased by the speed changing means 31, such as that shown in FIG. 1, the positions in which the balls 14 rotate get closer to the second input shaft 3b and the balls 14 roll on a relatively axially inner part of the inner ring 11. In this state, since the circumferential length of the part of the inner ring 11 on which the balls 14 roll is reduced and the rotational speed of the balls 14 rolling on the inner ring 11 is reduced, the rotational speed of the balls 14 around the second input shaft 3b is reduced. In this state, the speed reduction ratio is enlarged.

On the other hand, when the distance between the two concave surfaces 27, 35 of the outer ring 13 is increased by the speed changing means 31, such as that shown in FIG. 2, the positions in which the balls 14 rotate move away from the second input shaft 3b and the balls 14 roll on a relatively axially outer part of the inner ring 11. In this state, since the circumferential length of the part of the inner ring 11 on which the balls 14 roll is larger and the rotational speed of the balls 14 rolling on the inner ring 11 during a rotation of the second input shaft 3b is larger, the rotational speed of the balls 14 around the second input shaft 3b is larger. In this state, the speed reduction ratio is reduced. As described above, the speed reduction ratio of the continuously variable transmission 1 is able to be continuously varied between the maximum and minimum values by changing the distance between the two concave surfaces 27, 35 with the speed changing means 31.

When a vehicle, such as a motorcycle or scooter, for example but without limitation, is equipped with the continuously variable transmission 1 and uses engine braking during running, driving force in the opposite direction is applied from the chain sprocket 2 to the cylindrical output shaft 61. The driving force in the opposite direction is directly transmitted from the cylindrical output shaft 61 to the second input shaft 3b via the one-way clutch 71 and is transmitted from the second input shaft 3b to the crankshaft via the first input shaft 3a and the clutch. Thus, because the illustrated continuously variable transmission 1 can transmit all the driving force in the opposite direction from the cylindrical output shaft 61 to the engine, sufficient engine braking is available. In addition, the illustrated continuously variable transmission enables the engine to be started by push-starting.

Moreover, in the illustrated continuously variable transmission 1, lubricant can be constantly supplied from the lubricant pump 77 for the transmission to the axial part of the inner ring 11 and to the contact parts of the balls 14. Thus, the inner and outer rings 11, 13 are lubricated and, in the illustrated continuously variable transmission 1, the contact parts of the balls 14 and the inner and outer ring 11 and 13 can be lubricated effectively and reliably. Accordingly, in the illustrated continuously variable transmission, temperature rise and wear of the contact parts of the balls and the inner and outer rings can be greatly reduced or eliminated. Moreover, the continuously variable transmission can be more easily incorporated into applications featuring higher-power engines.

Figure 10:
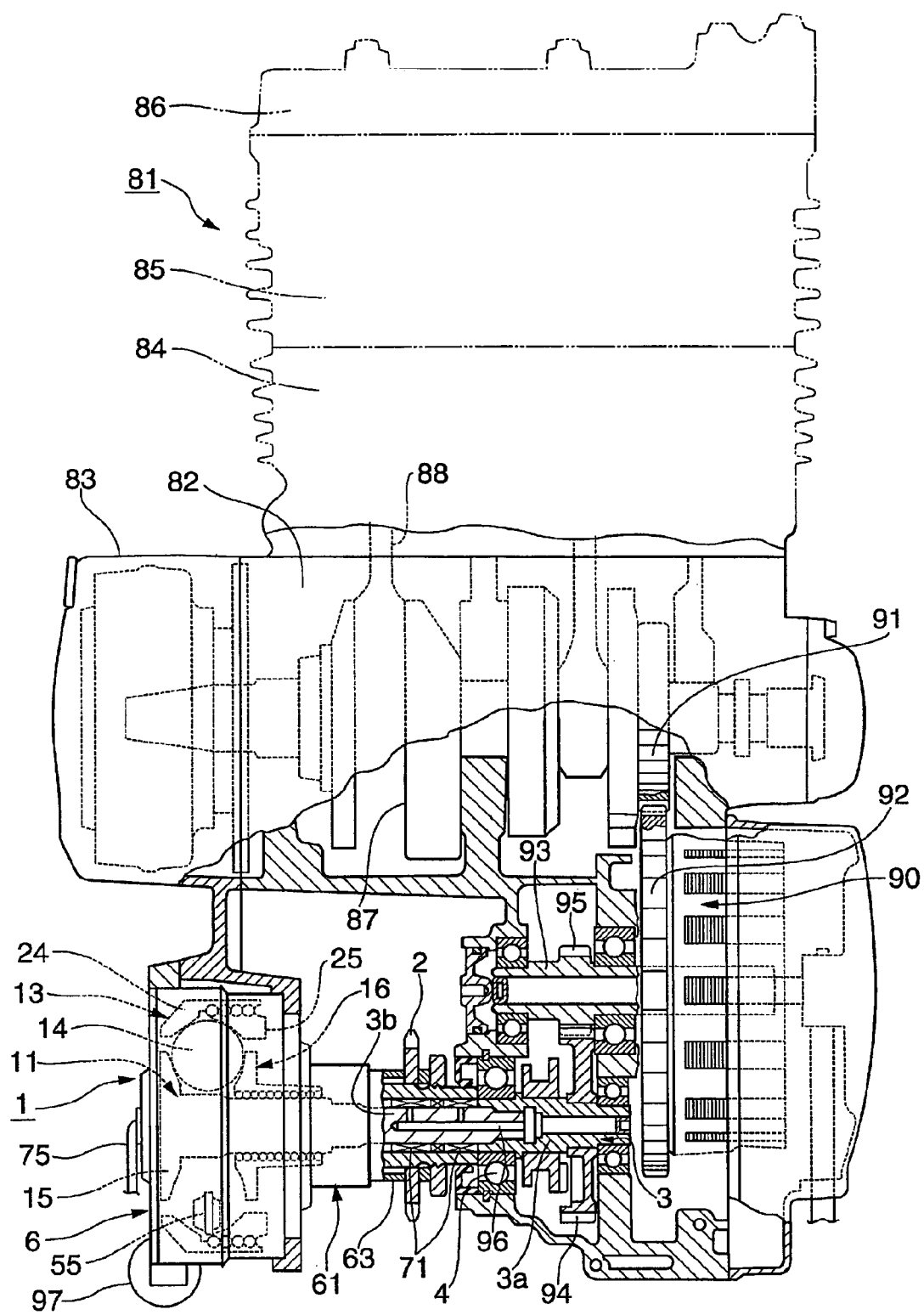
FIG. 10 is a view of an engine for a motorcycle, where the engine is coupled with the transmission of FIG. 1.
Figure 11:
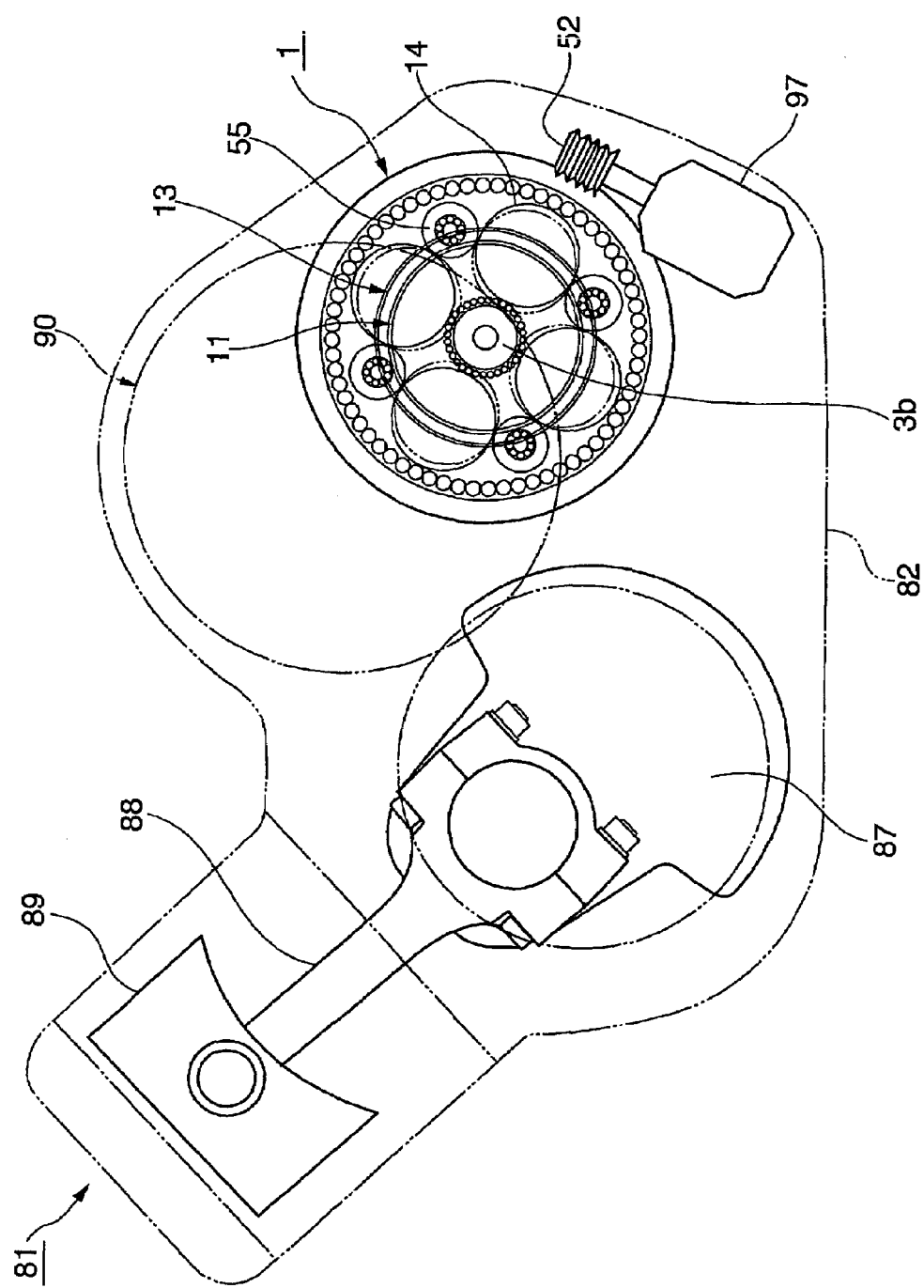
FIG. 11 is a side view of the engine and transmission shown in FIG. 10.

With reference to FIGS. 10 and 11, the continuously variable transmission of FIG. 1 is shown combined with an engine 81. The illustrated engine 81 can be used with a small vehicle, such as a motorcycle or scooter, for instance but without limitation. It should be noted that members identical with or otherwise corresponding to those described with reference to FIGS. 1 to 9 are denoted in the drawings by the same reference numerals and their detailed description is not repeated hereinafter unless necessary or desired for proper understanding of the description.

As illustrated, the four-cycle, two-cylinder engine 81 comprises a crankcase 82, a crankcase cover 83, a cylinder body 84, a cylinder head 85, a head cover 86, a crankshaft 87, a connecting rod 88, a piston 89, and a hand operated clutch 90. Any suitable type of engine can be used (e.g., operating principle, number of cylinders, and type of cylinder bank construction). The illustrated cylinder body 84 is formed such that the axes of the cylinders incline forward and upward as shown in FIG. 11. Such a construction provides a more compact engine that can be more easily accommodated on a small vehicle.

The clutch 90, which can have any suitable configuration, including but not limited to a multiple disk clutch, preferably comprises a speed reduction large gear 92 that is in meshing engagement with a driving gear 91, which is mounted on the crankshaft 87. The clutch 90 preferably can switch between a connected state, in which the rotation of the large gear 92 can be transmitted to a clutch shaft 93, and a disconnected state, in which the power transmission route is disconnected. The clutch shaft 93 can be disposed generally parallel to the crankshaft 87. The clutch shaft 93 preferably comprises an engine drive shaft in some configurations.

The illustrated continuously variable transmission 1 is configured with its axial direction extending in the vehicle width direction. In the illustrated configuration, the end of the input shaft 3 of the continuously variable transmission 1 on the right side of the vehicle body is in meshing engagement with the clutch shaft 93 via two speed reduction gears 94, 95. The inner ring 11 (ball rolling part) can be provided on the end of the input shaft 3 on the left side of the vehicle body. The small-diameter portion 63 of the generally cylindrical output shaft 61 and the one-way clutch 71 can be located around an axially intermediate portion of the input shaft 3. The chain sprocket 2 can be attached to an outer periphery of the small-diameter portion 63.

In the illustrated configuration, a lubricant passage 96 can be formed in the end of the input shaft 3 of the continuously variable transmission 1 on the right side in the vehicle body. Engine lubricant can be supplied to the lubricant passage 96 from a pump (not shown) and the lubricant passage 96 directs the engine lubricant to the one-way clutch 71. As described above, however, the components within the transmission housing 6 can be lubricated by the lubricant supplied from the lubricant pump 77 that is used for lubricating only the transmission.

With reference now to FIG. 11, the illustrated continuously variable transmission 1 is disposed at the rear end of the crankcase 82 and partially overlaps with the clutch 90 as viewed from a side. Other suitable configurations can be used but the illustrated configuration is advantageously compact. In FIG. 11, the component located at the lower rear end of the continuously variable transmission 1 and designated as 97 is a speed changing motor of the speed changing means 31. The speed changing motor 97 can be mounted to the lower end of the transmission housing 6 on the rear side in the vehicle body with its axis inclined backward and upward. Other suitable configurations also can be used.

In a conventional engine, an output shaft that drives the driven wheel meshes with the clutch shaft via speed reduction gears. The illustrated engine 81 differs from the conventional engine in the constitution of the output shaft. Thus, the illustrated engine 81 can easily be constructed by attaching the input shaft of the continuously variable transmission 1 to a conventional engine instead of the output shaft.

Figure 12:
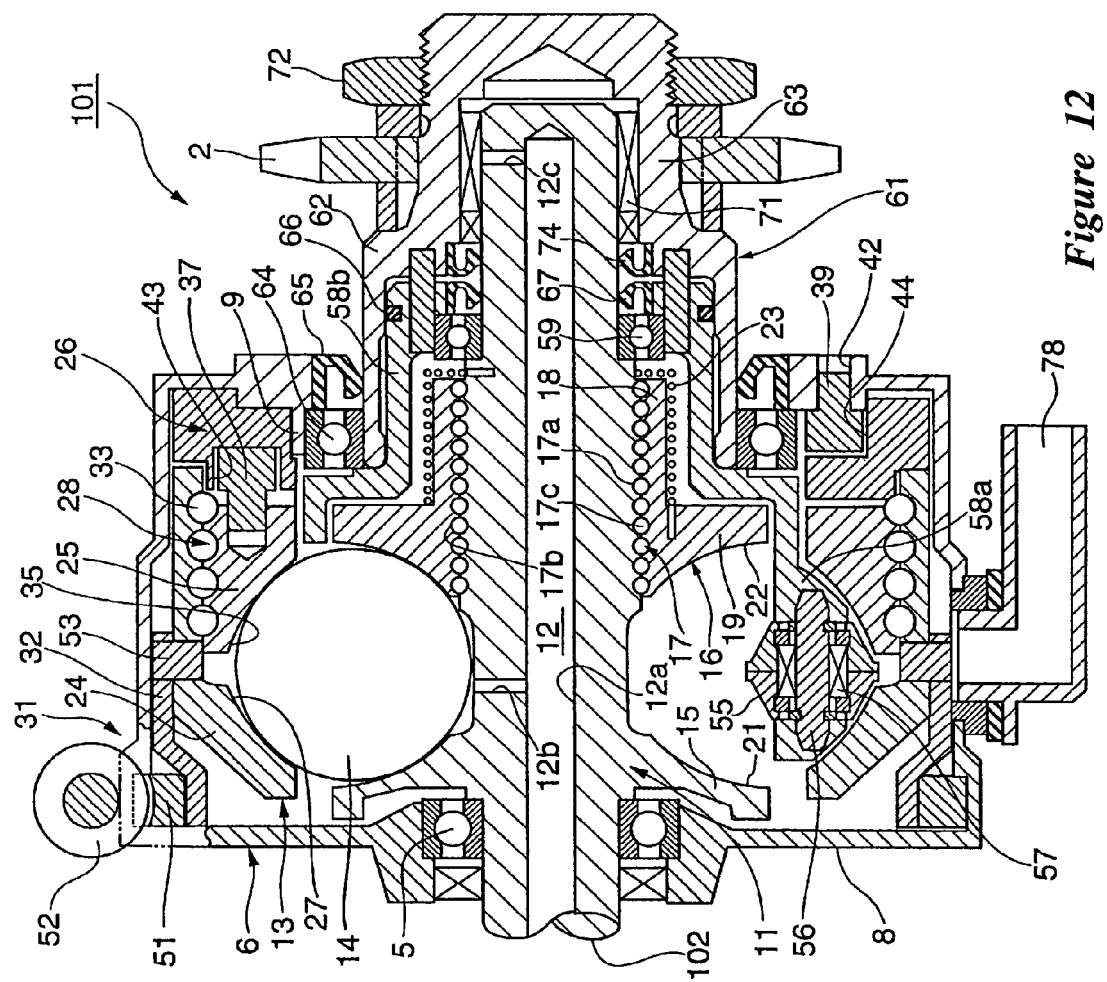
FIG. 12 is vertical cross-sectional view of another continuously variable transmission that is arranged and configured in accordance with certain features, aspects and advantages of the present invention.
Figure 13:
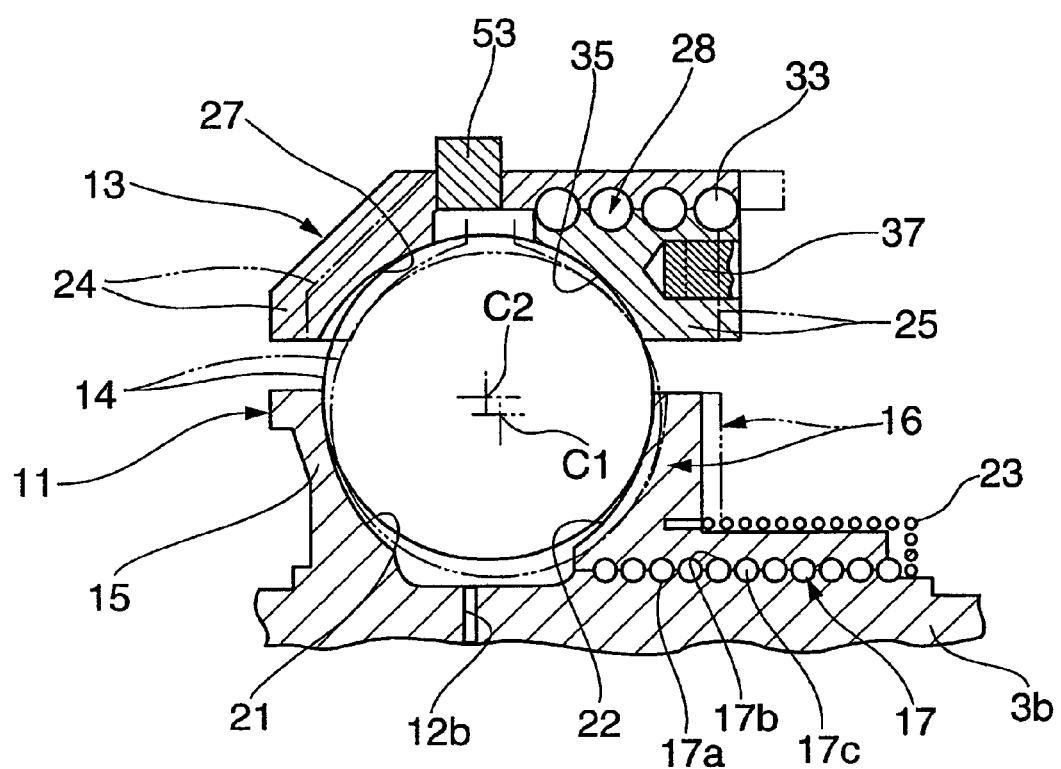
FIG. 13 is an enlarged cross-sectional view of a portion of the transmission of FIG. 12 and illustrating a ball at the time when the speed reduction ratio is small.

With reference now to FIGS. 12 and 13, another transmission 101 that is arranged and configured in accordance with certain features, aspects and advantages of the present invention is illustrated therein. As described above, members that identical with or corresponding to those described above with reference to FIGS. 1 to 11 are denoted in the drawings by the same reference numerals and their detailed description is not repeated unless necessary or desired for a proper understanding in the following description.

The continuously variable transmission 101 shown in FIGS. 12 and 13 is similar in many respects to the continuously variable transmission 1 described with reference to FIGS. 1-9 except the input shaft and the cylindrical output shaft have been altered. In the configuration illustrated in FIGS. 12 and 13, an engine drive shaft (not shown) is connected to one end of an input shaft 102 of the continuously variable transmission 101 where the first inner half 15 is located and a small-diameter portion 63 of a generally cylindrical output shaft 61 is connected to the other end of the input shaft 102 via the one-way clutch 71. The end of the generally cylindrical output shaft 61 opposite the balls 14 is closed and the generally cylindrical output shaft 61 has a bottomed cylindrical shape. In other words, the input end of the input shaft 102 has been flipped relative to the configuration of FIGS. 1-9.

In the illustrated configuration, the input shaft 3 has a lubricant passage 12 formed so as to supply lubricant to both the ball accommodating space and the one-way clutch accommodating space. The illustrated lubricant passage 12 has an axial extension 12a formed in the input shaft 3 from one end to the other. Radial extensions 12b and 12c extend from the axial extension 12 in locations that generally correspond to the balls 14 and the one-way clutch 71, respectively. In this configuration, lubricant (e.g., engine oil) is supplied to the lubricant passage 12 by an engine lubricant pump (not shown).

Figure 14:
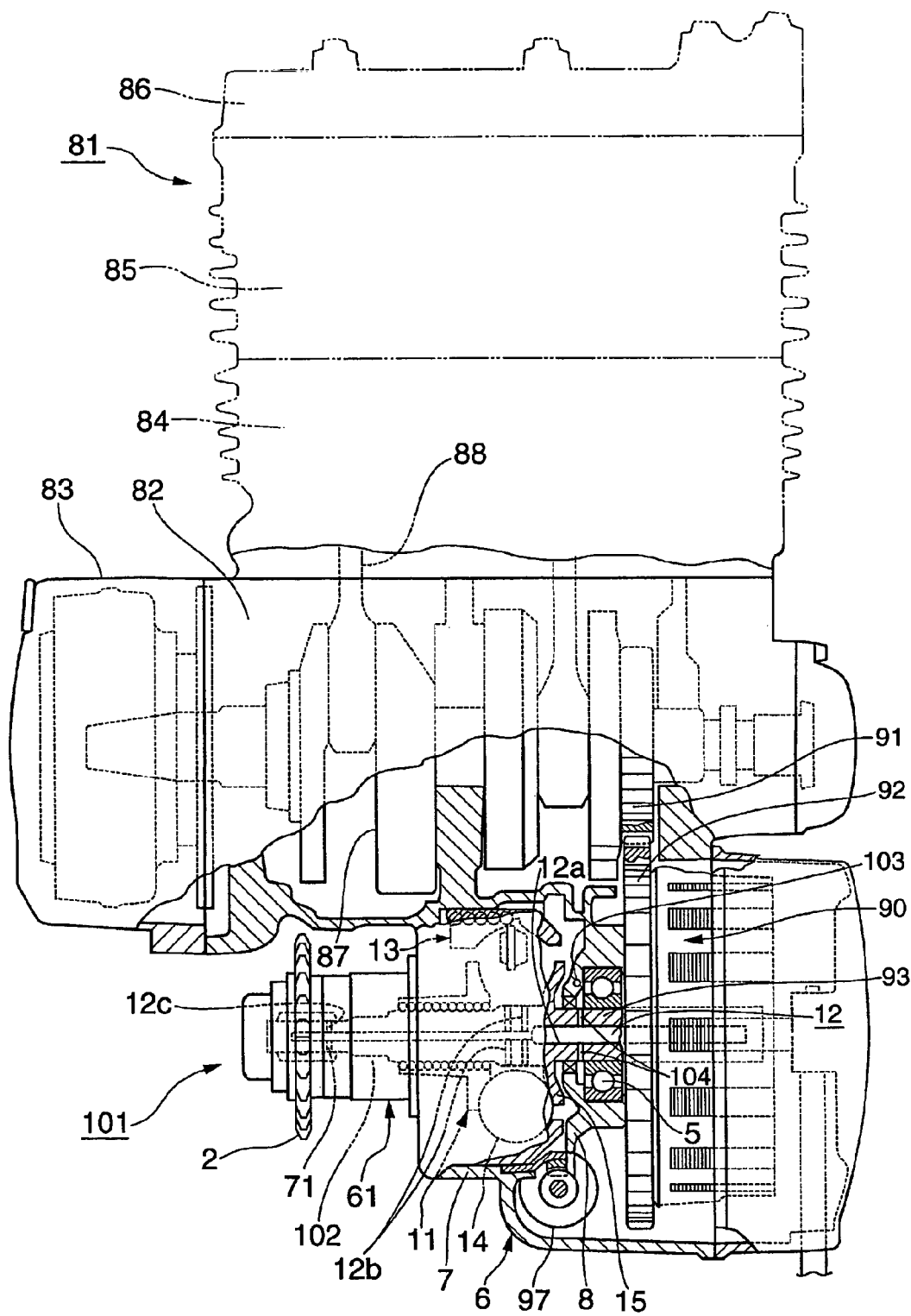
FIG. 14 is a view of an engine for a motorcycle, where the engine is coupled with the transmission of FIG. 12.
Figure 15:
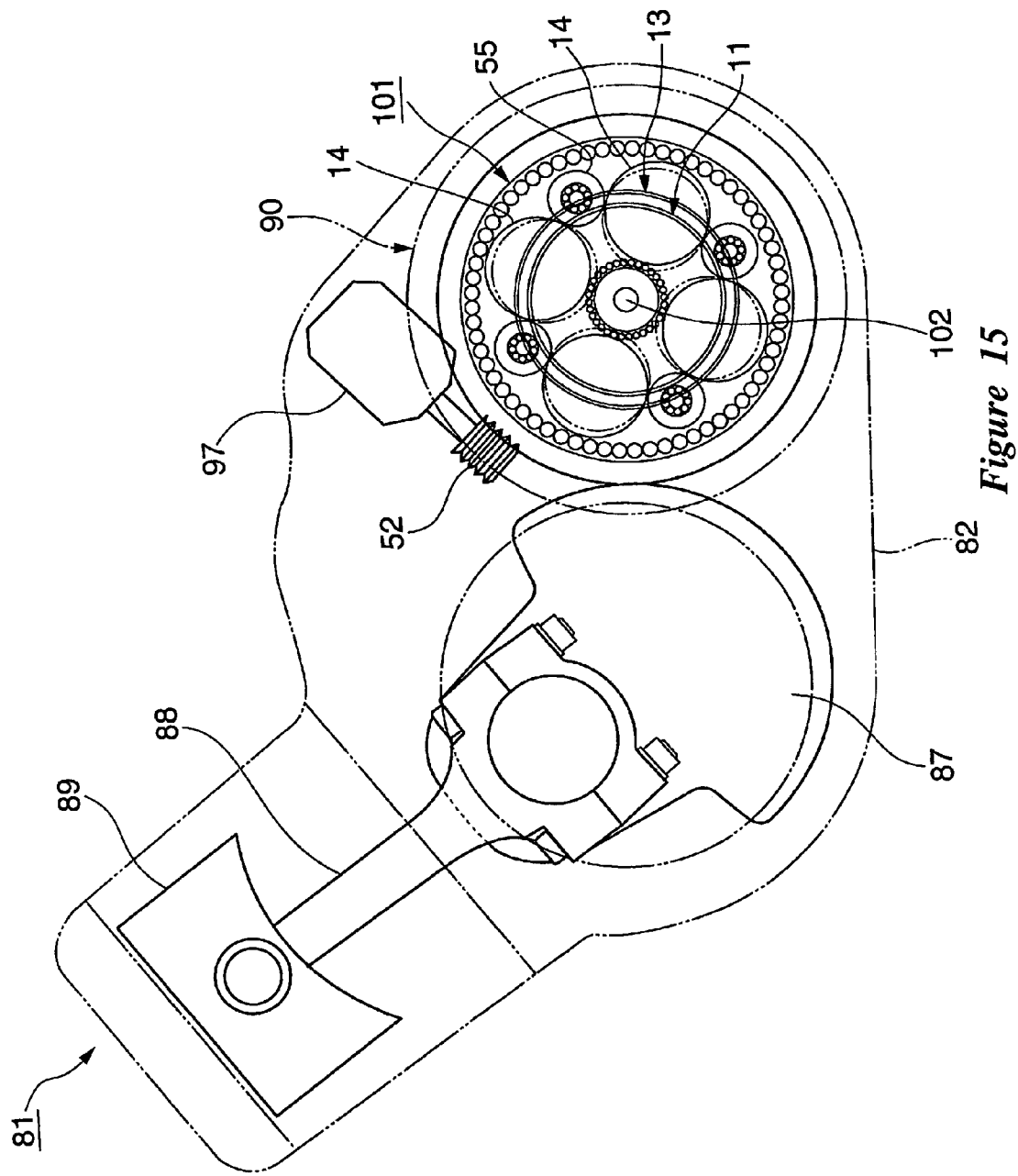
FIG. 15 is a side view of the engine and transmission shown in FIG. 14.

With reference now to FIGS. 14 and 15, the continuously variable transmission 101 of FIG. 12 can be joined with an engine as illustrated. As mentioned above, members identical with or corresponding to those described with reference to FIGS. 1 to 13 are denoted in the drawings by the same reference numerals and their detailed description is not repeated.

The continuously variable transmission 101 preferably is disposed coaxially with the clutch 90. The first inner ring half 15 side end of the input shaft 102 of the continuously variable transmission 101 can be formed integrally with the clutch shaft 93 (e.g., engine drive shaft). The input shaft 102 can extends in the vehicle width direction at a location generally rearward of the crankshaft 87. The cylindrical output shaft 61, the one-way clutch 71 and the chain sprocket 2 can be mounted on the end of the input shaft 102 on the left side of the vehicle body.

The lubricant passage 12 that is defined in the input shaft 102 of the continuously variable transmission 101 can be connected to an engine lubricant supply passage 103, which may be formed in the crankcase 82, via communication passages 104. Engine lubricant is supplied to the engine lubricant supply passage 103 from a lubricant pump (not shown). The axial extension 12a of the lubricant passage 12 preferably extends generally in the transverse direction of the vehicle body in the input shaft 102 and can be closed at both ends of the input shaft 102 to balance the forces experienced at the input shaft. The radial extensions 12b of the lubricant passage 12 can be formed in positions that generally correspond to the first and second inner ring halves 15 and 16 while the radial extensions 12c can be formed in positions that generally correspond to the one-way clutch 71.

As illustrated, the transmission housing 6 of the continuously variable transmission 101 can be formed, in part or in totality, by the crankcase 82. That is, the housing body 7 of the transmission housing 6 can be formed by shaping part of the crankcase 82 behind the crankshaft 87 into a generally cylindrical or other accommodating shape, and the lid 8 can be formed by a generally vertical wall that may be provided in the crankcase 82. Other suitable configurations also can be used. The speed changing motor 97 of the continuously variable transmission 101 also can be housed in the transmission housing 6.

Because power can be directly transmitted from the clutch shaft 93 (e.g., the engine drive shaft) to the input shaft 102 of the continuously variable transmission 101 in the illustrated engine 81, the coupling structure for joining the clutch shaft 93 to the continuously variable transmission 101 is simplified. Thus, it is possible to achieve an advantageous reduction in size and weight of the engine 81 while employing the ball type continuously variable transmission 101. As a result, it is possible to achieve a further reduction in weight of a small vehicle provided with the illustrated engine 81 and transmission combination.

Figure 16:
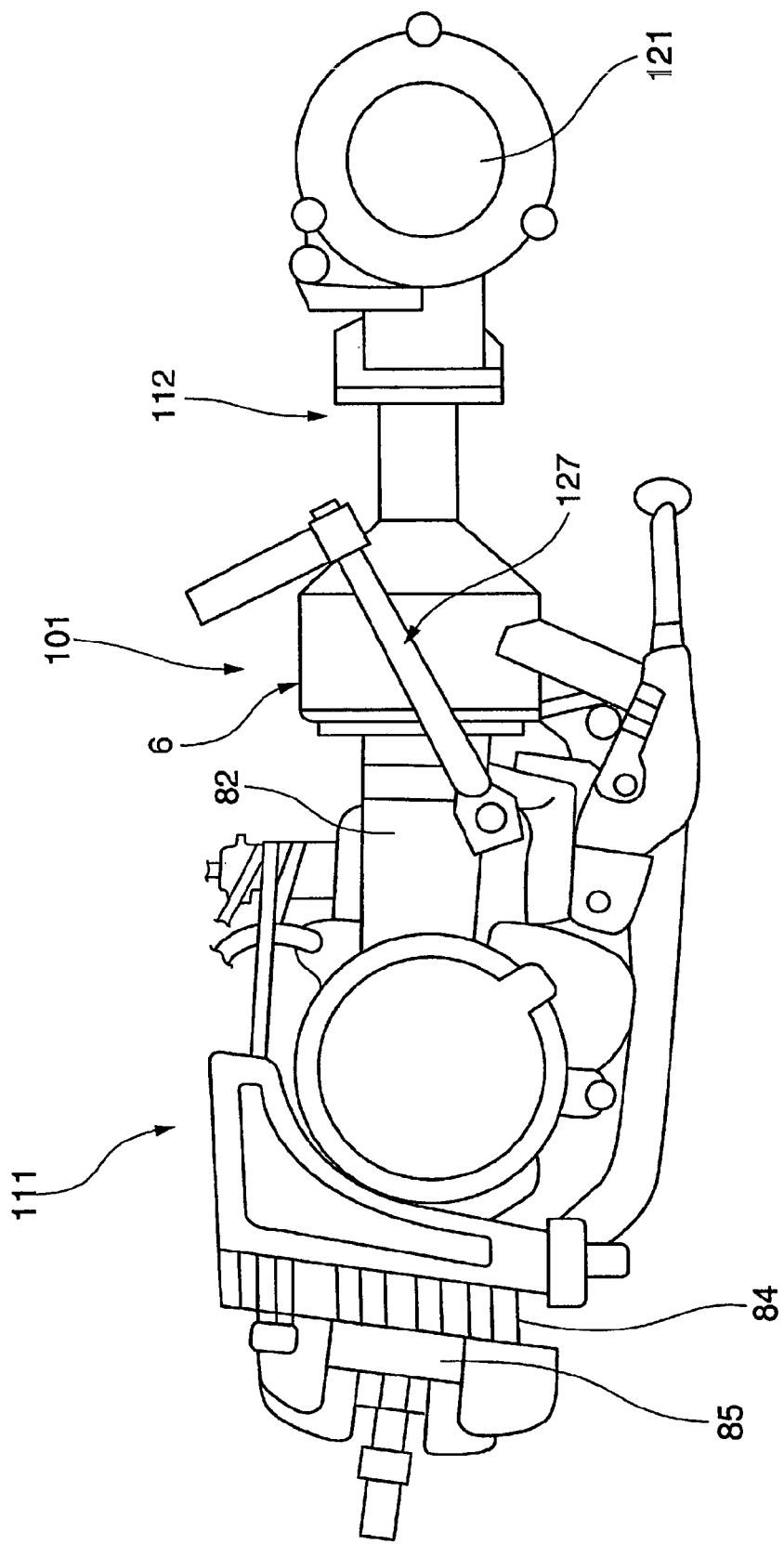
FIG. 16 is a side view, illustrating another embodiment that is arranged and configured in accordance with certain features, aspects and advantages of the present invention.
Figure 17:
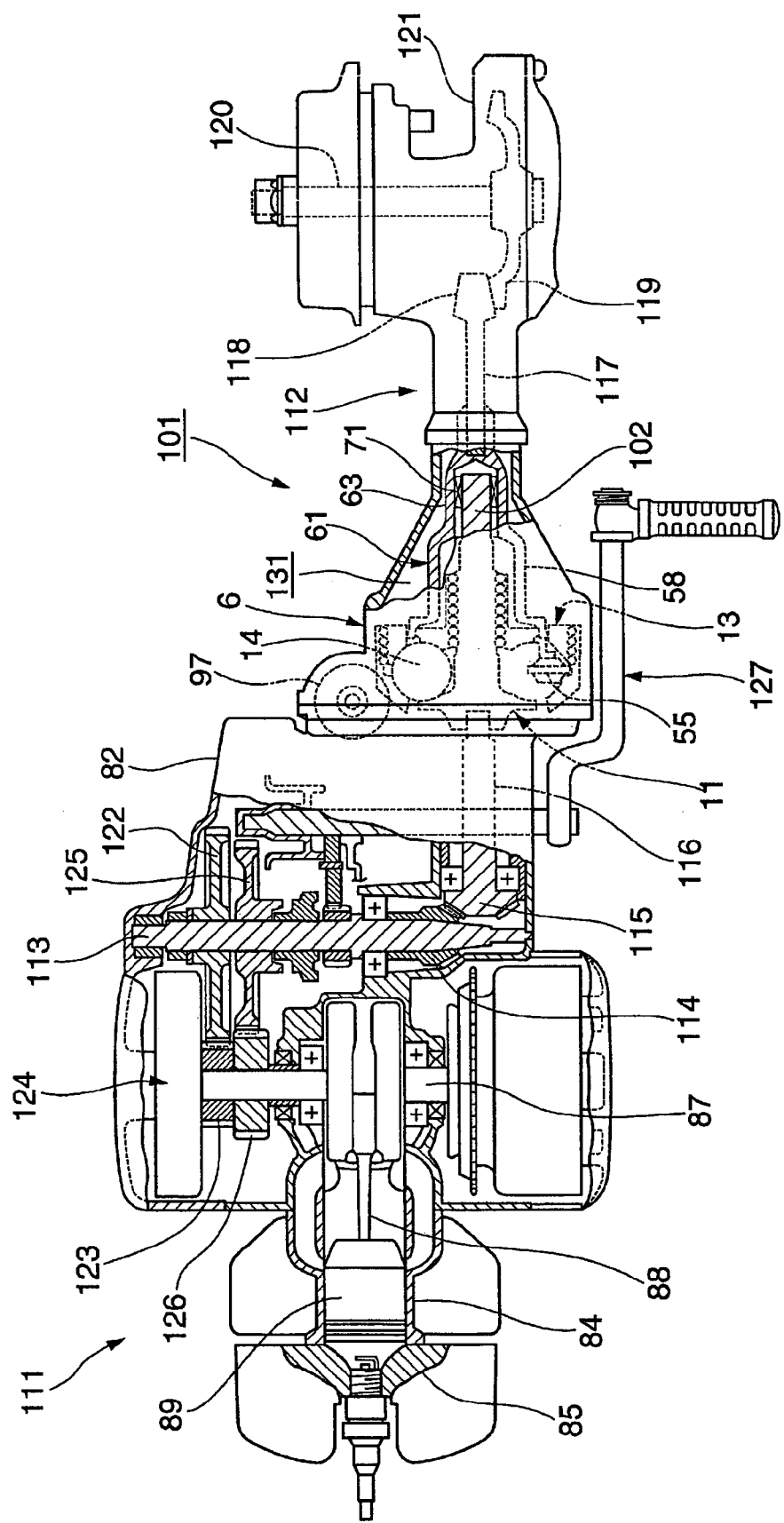
FIG. 17 is a cross-sectional view taken along the line XVII-XVII in FIG. 16.

FIGS. 16 and 17 illustrate an additional construction that is arranged and configured in accordance with certain features, aspects and advantages of the present invention. Members identical with or generally corresponding to those described with reference to FIGS. 1 to 15 are denoted in the drawings by the same numerals and their detailed description is not repeated.

An engine 111, which is shown in FIGS. 16 and 17, can be an air-cooled, single-cylinder engine for a small vehicle, such as a motorcycle or scooter. The illustrated engine 111 comprises a forwardly inclined cylinder and a shaft drive transmission 112 that is used to drive the rear wheel. In the illustrated engine 111, a continuously variable transmission 101 can comprise the part of the shaft drive transmission 112 that extends in the longitudinal direction of the vehicle body and the transmission 101 can have generally the same construction as shown in FIGS. 12 through 15.

As shown in FIG. 17, the illustrated shaft drive transmission 112 has a front transmission shaft 116 that meshes with an engine drive shaft 113, which is disposed rearward of the crankshaft 87 and which extends generally parallel to the crankshaft 87. The drive shaft 113 and the transmission shaft 116 can be connected via bevel gears 114 and 115. The transmission shaft 116 preferably extends toward the rear of the vehicle body. The continuously variable transmission 101 is connected to the rear end of the front transmission shaft 116. A rear transmission shaft 117 is coupled to the generally cylindrical output shaft 61 of the continuously variable transmission 101. A rear wheel shaft 120 meshes with the rear transmission shaft 117 via bevel gears 118 and 119. The rear wheel shaft 120 can be rotatably supported by a rear wheel side gear box 121 and the hub of the rear wheel can be secured to the end of the rear wheel shaft 120, which protrudes to the right side of the vehicle body from the gear box 121.

The output side of a centrifugal clutch 124 can be connected to the end of the engine drive shaft 113 on the right side of the vehicle body via speed reduction gears 122, 123. The centrifugal clutch 124 can be mounted on the end of the crankshaft 87 on the right side of the vehicle body and is used to transmit output power when the rotational speed of the crankshaft 87 increases. The gears 125, 126, which preferably are provided adjacent to the speed reduction gears 122, 123, are output gears for a kick starter 127.

In the illustrated configuration, the continuously variable transmission 101 can be incorporated in the shaft drive transmission 112 with its axial direction extending in the vehicle longitudinal direction and with the front transmission shaft 116 being disposed on the end of the input shaft 102 on the front side of the vehicle body. The bevel gears 114 and 115 interposed between the front transmission shaft 116 and the engine drive shaft 113 are configured to reduce the rotational speed of the engine drive shaft 113 and transmit the rotation of the engine drive shaft 113 to the front transmission shaft 116. That is, the input shaft 102 of the continuously variable transmission 1 preferably is connected to the engine drive shaft 113 via speed reduction gears (114, 115) as in the case with the continuously variable transmission 1 shown in the embodiment of FIG. 10.

The rear end of the cylindrical output shaft 61 of the continuously variable transmission 101 extends rearward beyond the rear end of the input shaft 102, and the front end of the rear transmission shaft 117 can be connected to the extended portion of the generally cylindrical output shaft 61. The transmission housing 6 of the illustrated continuously variable transmission 101 can be supported by the rear end of the crankcase 82 and the rear wheel side gear box 121. The rear wheel side gear box 121 can be rigidly secured to a body frame by a frame member (not shown). Other suitable configurations also can be used.

In the arrangement of FIG. 17, the continuously variable transmission 101 can be lubricated by engine lubricant supplied to an oil chamber 131 formed in the transmission housing 6. The lubricant can be supplied to the oil chamber 131 by a pump (not shown) and splashed by the balls 14 and the driven rollers 55, which are positioned to rotate in the oil chamber 131. The one-way clutch 71, which is interposed generally between the input shaft 102 and the generally cylindrical output shaft 61, can be lubricated by lubricant which flows into the generally cylindrical output shaft 61 from the side of the balls 14.

The illustrated engine 111 differs from an engine in which a shaft drive transmission is connected to the engine drive shaft via speed reduction bevel gears and which is not equipped with a transmission mainly in the construction of the shaft drive transmission. Thus, a shaft drive engine equipped with a continuously variable transmission can be easily constructed by replacing the shaft drive device of an engine which is not otherwise equipped with a transmission with the illustrated continuously variable transmission 102.

With reference to each of the embodiments described above, the one-way clutch 71, which is generally interposed between the second input shaft 3b, or the input shaft 102, and the generally cylindrical output shaft 61, may be of any suitable type, such as, for example but without limitation, a claw clutch, a roller clutch, or a sprag clutch, as long as driving force in the opposite direction transmitted from the driving wheel to the engine of a small vehicle can be suitably transmitted.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An engine and continuously variable transmission assembly comprising a continuously variable transmission, the transmission comprising a transmission input shaft having an axial direction, the transmission input shaft being coupled to an engine crankshaft, the transmission input shaft receiving rotation from the engine crankshaft, an inner ring comprising a first half and a second half, the inner ring first half and the inner ring second half being generally aligned in the axial direction of the transmission input shaft, the inner ring first half and the inner ring second half being joined for rotation with the transmission input shaft, an outer ring comprising a first half and a second half, the outer ring first half and the outer ring second half being located radially outward from the inner ring, the outer ring first half and the outer ring second half being generally aligned in the axial direction of the transmission input shaft, the outer ring first half and the outer ring second half being generally restrained from rotating around the axis of the transmission input shaft, a plurality of transmitting balls rollable between the inner ring and the outer ring, a plurality of driven rollers interposed between the transmitting balls and in contact with the transmitting balls, a roller supporting member carrying the driven rollers, the roller supporting member being rotatable around the axis of the transmission input shaft, a transmission output shaft connected to the roller supporting member and a wheel driving transmission member, the transmission output shaft being rotatable around the axis of the transmission input shaft, and a speed changing mechanism coupled to the outer ring such that the distance between the first outer ring half and the second outer ring half can be adjusted, adjustment of the distance between the first outer ring half and the second outer ring half varying the rotational speed of the driven rollers around the inner ring, wherein the transmission output shaft has a generally cylindrical portion, the transmission input shaft extending at least partway into the generally cylindrical portion, and a one-way clutch connecting the transmission output shaft and the transmission input shaft such power can be transmitted through the one-way clutch from the transmission output shaft to the transmission input shaft, the one-way clutch being positioned within the generally cylindrical portion.

2. The assembly of claim 1, wherein the transmission input shaft comprises an internal lubricant passage that extends from an end of the transmission input shaft to a position on the outer periphery thereof that corresponds to the transmitting balls, the internal lubricant passage being connected to a lubricant supply device.

3. The assembly of claim 1, wherein a first end portion of transmission input shaft is generally parallel to an engine drive shaft, the transmission input shaft meshing with the engine drive shaft.

4. The assembly of claim 3, wherein the balls are positioned about a second end portion of the transmission input shaft.

5. The assembly of claim 4, wherein the generally cylindrical portion of the transmission output shaft and the one-way clutch are disposed between the first end portion and the second end portion of the transmission input shaft.

6. The assembly of claim 5, wherein the wheel driving transmission member is positioned on the generally cylindrical portion of the transmission output shaft.

7. The assembly of claim 6, wherein the wheel driving transmission member comprises a sprocket.

8. The assembly of claim 1, wherein a first end portion of the transmission input shaft is connected coaxially to an engine drive shaft.

9. The assembly of claim 8, wherein the balls are positioned around an intermediate portion of the transmission input shaft.

10. The assembly of claim 9, wherein the generally cylindrical portion of the transmission output shaft and the one-way clutch are positioned at a second end portion of the transmission input shaft.

11. The assembly of claim 10, wherein the wheel driving transmission member is disposed on the generally cylindrical portion.

12. The assembly of claim 11, wherein the wheel driving transmission member is a sprocket.

13. An engine and continuously variable transmission assembly comprising a continuously variable transmission, the transmission comprising a transmission input shaft having an axial direction, the transmission input shaft being driven by an engine crankshaft, an inner ring mounted to the transmission input shaft, the inner ring comprising a first half and a second half, at least two balls being positioned between the first half and the second half of the inner ring, the inner ring first half and the inner ring second half being joined for rotation with the transmission input shaft, the at least two balls also being positioned between the inner ring and an outer ring, the outer ring comprising a first half and a second half, the at least two balls being positioned between the outer ring first half and the outer ring second half, a roller interposed between two adjacent balls of the at least two balls, the roller contacting both of the adjacent balls, the roller being mounted on a roller supporting member, the roller supporting member being rotatable around the axis of the transmission input shaft, a transmission output shaft connected to the roller supporting member, a wheel driving transmission member connected to the transmission output shaft, the transmission output shaft being rotatable around the axis of the transmission input shaft, a one-way clutch connecting the transmission input shaft and the transmission output shaft, and a speed changing mechanism coupled to the outer ring such that the distance between the first outer ring half and the second outer ring half can be adjusted with adjustment of the distance between the first outer ring half and the second outer ring half varying the rotational speed of the roller around the inner ring.

14. The assembly of claim 13, wherein the first half of the inner ring is integrally formed with the transmission input shaft.

15. The assembly of claim 13, wherein the first half of the inner ring and the second half of the inner ring urged together by a biasing member.

16. The assembly of claim 13, wherein the transmission output shaft has a generally cylindrical portion and the transmission input shaft extends at least partway into the generally cylindrical portion.

17. The assembly of claim 16, wherein the one-way clutch is positioned within the generally cylindrical portion of the transmission output shaft.

* * * * *

UNITED STATES PATENT AND TRADEMARK OFFICE
CERTIFICATE OF CORRECTION

| | |
|---|---|
| PATENT NO. | : 7,285,068 B2 |
| APPLICATION NO. | : 11/259496 |
| DATED | : October 23, 2007 |
| INVENTOR(S) | : Yukiharu Hosoi |

Page 1 of 1

It is certified that error appears in the above-identified patent and that said Letters Patent is hereby corrected as shown below:

At First Page, column 1 (Assignee), line 2, please delete "(KP)" and insert -- (JP) --, therefor.

At column 4, line 64, please delete "FIGS." and insert -- FIG. --, therefor.

Signed and Sealed this

Twenty-ninth Day of July, 2008

JON W. DUDAS
*Director of the United States Patent and Trademark Office*